US008600979B2

(12) United States Patent
Kim et al.

(10) Patent No.: US 8,600,979 B2
(45) Date of Patent: Dec. 3, 2013

(54) INFINITE BROWSE

(75) Inventors: Yookyung Kim, Los Altos, CA (US);
Hongjian Zhao, Fremont, CA (US); Xin Li, San Jose, CA (US); Alexandra Levich, Seattle, WA (US); Tom Chi, San Francisco, CA (US); Ming Sui, Fremont, CA (US); Yihong Zhao, San Jose, CA (US); Marc Davis, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 230 days.

(21) Appl. No.: 12/825,304

(22) Filed: Jun. 28, 2010

(65) Prior Publication Data
US 2011/0320437 A1 Dec. 29, 2011

(51) Int. Cl.
*G06F 7/00* (2006.01)
(52) U.S. Cl.
USPC ............ 707/722; 707/730; 707/732; 707/734
(58) Field of Classification Search
None
See application file for complete search history.

(56) References Cited

U.S. PATENT DOCUMENTS

| | | | |
|---|---|---|---|
| 5,446,891 A | 8/1995 | Kaplan et al. | |
| 5,727,129 A | 3/1998 | Barrett et al. | |
| 5,734,887 A | 3/1998 | Kingberg et al. | |
| 5,754,938 A | 5/1998 | Herz et al. | |
| 5,754,939 A | 5/1998 | Herz et al. | |
| 5,761,662 A | 6/1998 | Dasan | |
| 5,835,087 A | 11/1998 | Herz et al. | |
| 5,890,152 A | 3/1999 | Rapaport et al. | |
| 5,895,470 A | 4/1999 | Pirolli et al. | |
| 5,918,014 A | 6/1999 | Robinson | |
| 5,937,397 A | 8/1999 | Callaghan | |
| 5,937,422 A * | 8/1999 | Nelson et al. | 715/206 |
| 6,018,738 A | 1/2000 | Breese et al. | |
| 6,029,195 A | 2/2000 | Herz | |
| 6,049,776 A | 4/2000 | Donnelly et al. | |

(Continued)

FOREIGN PATENT DOCUMENTS

| WO | WO 2004/114163 A2 | 12/2004 |
|---|---|---|
| WO | WO 2005/050491 A1 | 6/2005 |

OTHER PUBLICATIONS

International Searching Authority, International Search Report for PCT application No. PCT/US2010/041960 with written opinion dated Feb. 18, 2011, 9pgs.
Current claims for PCT application No. PCT/US2010/041960, 4 pgs.

(Continued)

*Primary Examiner* — Anh Tai Tran
(74) *Attorney, Agent, or Firm* — Hickman Palermo Truong Becker Bingham Wong LLP; Karl T. Rees

(57) ABSTRACT

An online article is enhanced by displaying, in association with the article, supplemental content that includes entities that are extracted from the article and/or entities that are related to entities that are extracted from the article. The supplemental content further includes information about each of the entities. The information about an entity may be obtained by searching for the entity in one or more searchable repositories of data. For example, the supplemental content may include, for each entity, video, image, web, and/or news search results. The supplemental content may further include information such as stock quotes, abstracts, maps, scores, and so on. The entities are selected using a variety of analyses and ranking techniques based on contextual factors such as user-specific information, time-sensitive popularity trends, grammatical features, search result quality, and so on. The entities may further be selected for purposes such as generating ad-based revenue.

32 Claims, 11 Drawing Sheets

(56) References Cited

U.S. PATENT DOCUMENTS

| | | | |
|---|---|---|---|
| 6,092,049 A | 7/2000 | Chislenko et al. | |
| 6,128,663 A | 10/2000 | Thomas | |
| 6,134,532 A * | 10/2000 | Lazarus et al. | 705/14.25 |
| 6,202,058 B1 | 3/2001 | Rose et al. | |
| 6,249,740 B1 | 6/2001 | Ito et al. | |
| 6,349,299 B1 | 2/2002 | Spencer et al. | |
| 6,438,579 B1 | 8/2002 | Hosken | |
| 6,564,209 B1 | 5/2003 | Dempski et al. | |
| 6,728,706 B2 | 4/2004 | Aggarwal et al. | |
| 6,931,397 B1 | 8/2005 | Sundaresan | |
| 6,947,930 B2 | 9/2005 | Anick et al. | |
| 7,050,992 B1 | 5/2006 | Bowman et al. | |
| 7,200,638 B2 | 4/2007 | Lake | |
| 7,203,909 B1 | 4/2007 | Horvitz et al. | |
| 7,421,426 B2 | 9/2008 | Berstis et al. | |
| 7,478,035 B1 | 1/2009 | Wrench et al. | |
| 7,603,349 B1 | 10/2009 | Kraft et al. | |
| 7,739,280 B2 | 6/2010 | Aravamudan et al. | |
| 7,801,891 B2 | 9/2010 | Hu et al. | |
| 7,835,998 B2 | 11/2010 | Aravamudan et al. | |
| 7,856,441 B1 | 12/2010 | Kraft et al. | |
| 7,885,904 B2 | 2/2011 | Aravamudan et al. | |
| 7,970,762 B2 | 6/2011 | Goronzy et al. | |
| 7,984,004 B2 | 7/2011 | Andrew et al. | |
| 8,005,833 B2 | 8/2011 | Adar et al. | |
| 8,037,067 B1 | 10/2011 | Schnedler et al. | |
| 8,055,663 B2 | 11/2011 | Tsai et al. | |
| 8,301,623 B2 | 10/2012 | Chakrabarti et al. | |
| 8,316,020 B1 | 11/2012 | Kleinmann | |
| 2002/0062247 A1 | 5/2002 | Allen | |
| 2002/0103798 A1 | 8/2002 | Abrol et al. | |
| 2003/0040850 A1 | 2/2003 | Najmi et al. | |
| 2003/0061239 A1 | 3/2003 | Yoon | |
| 2003/0074369 A1 | 4/2003 | Schuetze et al. | |
| 2003/0110181 A1 | 6/2003 | Schetze et al. | |
| 2005/0154746 A1 * | 7/2005 | Liu et al. | 707/101 |
| 2005/0193335 A1 | 9/2005 | Dorai et al. | |
| 2005/0267973 A1 | 12/2005 | Carlson et al. | |
| 2006/0026013 A1 | 2/2006 | Kraft | |
| 2006/0053065 A1 | 3/2006 | Bowman et al. | |
| 2006/0106847 A1 * | 5/2006 | Eckardt et al. | 707/101 |
| 2006/0149710 A1 | 7/2006 | Koningstein et al. | |
| 2007/0260624 A1 | 11/2007 | Chung et al. | |
| 2007/0266025 A1 | 11/2007 | Wagner et al. | |
| 2008/0098026 A1 | 4/2008 | Kraft et al. | |
| 2008/0154873 A1 * | 6/2008 | Redlich et al. | 707/5 |
| 2008/0201304 A1 * | 8/2008 | Sue | 707/3 |
| 2008/0201643 A1 | 8/2008 | Nagaitis et al. | |
| 2008/0270151 A1 | 10/2008 | Mahoney et al. | |
| 2009/0037410 A1 | 2/2009 | Jones et al. | |
| 2009/0083278 A1 | 3/2009 | Zhao et al. | |
| 2009/0125544 A1 | 5/2009 | Brindley | |
| 2009/0138326 A1 | 5/2009 | Shi | |
| 2009/0171763 A1 | 7/2009 | Doug et al. | |
| 2009/0187515 A1 | 7/2009 | Andrew et al. | |
| 2009/0248514 A1 | 10/2009 | Ciaramita et al. | |
| 2009/0265338 A1 | 10/2009 | Kraft et al. | |
| 2009/0299945 A1 | 12/2009 | Hangartner | |
| 2010/0030717 A1 | 2/2010 | Agarwal et al. | |
| 2010/0083105 A1 | 4/2010 | Channabasavaiah | |
| 2010/0121624 A1 | 5/2010 | Roy et al. | |
| 2010/0169331 A1 * | 7/2010 | Karidi et al. | 707/754 |
| 2010/0241625 A1 | 9/2010 | Aravamudan et al. | |
| 2010/0250556 A1 | 9/2010 | Park | |
| 2010/0293160 A1 | 11/2010 | Aravamudan et al. | |
| 2011/0016121 A1 | 1/2011 | Sambrani | |
| 2011/0055209 A1 | 3/2011 | Novac et al. | |

OTHER PUBLICATIONS

U.S. Appl. No. 11/584,403, filed Oct. 29, 2006.
U.S. Appl. No. 12/504,527, filed Jul. 16, 2009.
The Hyperwords Company, "The Hyperwords Project," located at http://www.hyperwords.net, retrieved on Jan. 15, 2007, copyright 2005/2006 (1 page).
Vibrant Media, "IntelliTXT Words Engage," located at http://www.intellitxt.com, retrieved on Jan. 5, 2007, copyright 2006 (1 page).
Maglio, P. et al., "LiveInfo: Adapting web experience by customization and annotation." In Proceedings of the 1st International Conference on Adaptive Hypermedia and Adaptive Web-based Systems, AH2000, Trento, Italy, Aug. 2000 (10 pages).
Korean Intellectual Property Office, "International Search Report," International application No. PCT/US2007/081421, dated Mar. 27, 2008 (13 pages).
Claims, International application No. PCT/US2007/081421 (4 pages).
Taiwan Intellectual Property Office, "Examination Opinions" in application No. 099121797, dated Jul. 19, 2013, 7 pages.
Current Claims in application No. 099121797, dated Jul. 2013, 4 pages.

* cited by examiner

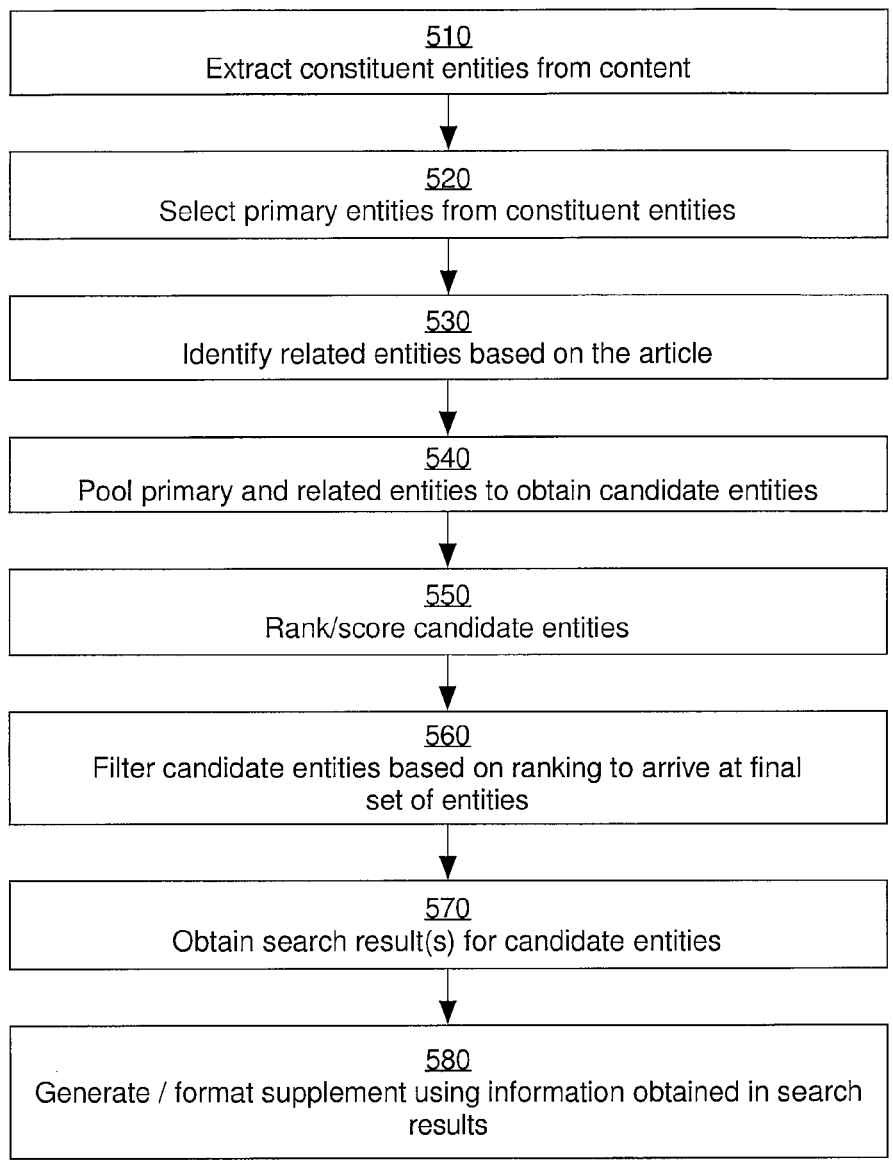

510 Extract constituent entities from content

520 Select primary entities from constituent entities

530 Identify related entities based on the article

540 Pool primary and related entities to obtain candidate entities

550 Rank/score candidate entities

560 Filter candidate entities based on ranking to arrive at final set of entities 570 Obtain search result(s) for candidate entities 580 Generate / format supplement using information obtained in search results

INFINITE BROWSE

CROSS-REFERENCE TO RELATED APPLICATIONS

This application is related to U.S. patent application Ser. No. 12/504,527, filed Jul. 16, 2009, entitled "Activity Based Users' Interests Modeling For Determining Content Relevance," by Sambrani et al., the entire contents of which are hereby incorporated by reference for all purposes as if fully set forth herein.

TECHNICAL FIELD

Embodiments relate generally to content presentation, and, more specifically, to techniques for supplementing content with contextually relevant search results.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

It is often useful for individuals (hereinafter "users") viewing online articles of content, such as news articles, blog entries, and emails, to obtain further information about various subjects of the article, including people, places, organizations, topics, products, and so on (hereinafter referred to as "entities"). Copious searchable resources are available to provide this information, but for a variety of reasons, users often do not attempt to access the information available in these resources. For example, a user may find the process of explicitly searching for entities within an article tedious. Or, the user may be unaware that a search for a particular entity within the article would produce information of interest to the user. Or, the user may be unaware that a search for a related entity within the article would produce information of interest to the user. Or, the user may be unaware of the existence of various searchable resources.

One approach to overcoming these and other problems is for the content provider to manually search for interesting information about the entities within the article and include that information with the article. Unfortunately, this approach is labor intensive and relies upon the content provider becoming knowledgeable about the types of information available for each entity within the article.

Another approach is to pre-parse content before sending it to a user, and highlight entities of potential interest. The entities are located using a dictionary of interesting terms. The entities may be highlighted by, for instance, textual markups indicating a hyperlink. Upon clicking or hovering over the hyperlink, the user is presented with information about the highlighted entity, such as editorial information or search results.

Current approaches for identifying entities of interest are limited in that they require an editor to manually add entities of interest to a dictionary. It is difficult for an editor to anticipate, at general level, which entities within a specific article may actually be of interest within the context of that article. Moreover, as the context within which an article is viewed constantly changes, it becomes even more difficult to make a dictionary-based prediction of which entities will be of interest to a user. Furthermore, existing techniques still require a user to take potentially inconvenient steps to obtain information about an entity (e.g. clicking on a link and waiting for a new web page to load). The user may not be interested in taking such steps because of a lack of certainty as to the quality of the information that may be obtained about the entity. Furthermore, many existing approaches do not take into consideration the possibility that the user may also be interested in information about related entities that do not appear within an article.

BRIEF DESCRIPTION OF THE DRAWINGS

The present invention is illustrated by way of example, and not by way of limitation, in the figures of the accompanying drawings and in which like reference numerals refer to similar elements and in which:

Figure 1A:
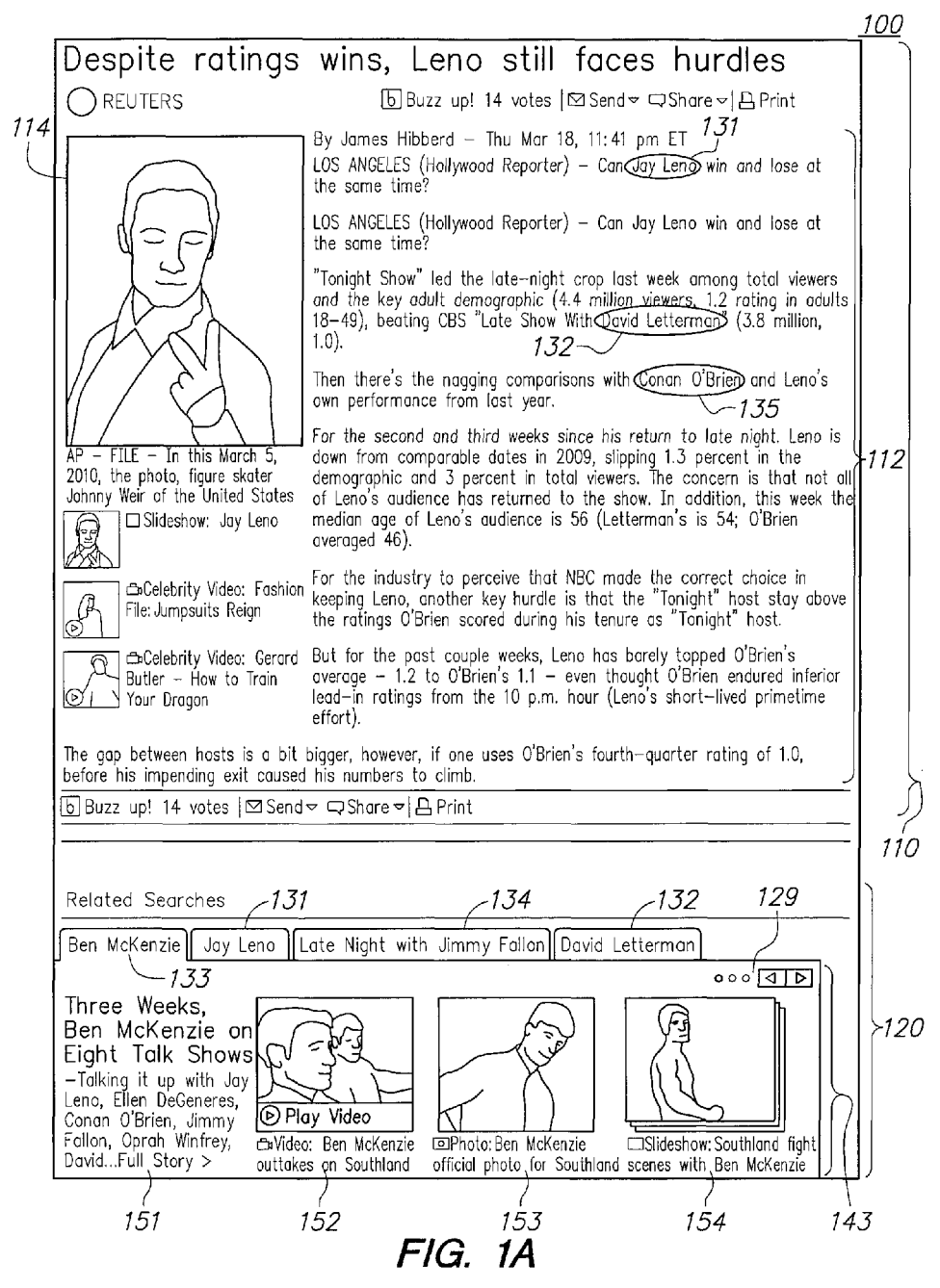

FIG. 1A is an exemplary screenshot depicting a display of an article of content and accompanying supplemental content;

FIG. 5 is a flow diagram illustrating an example technique for generating supplemental content for an article;

DETAILED DESCRIPTION

Figure 1B:
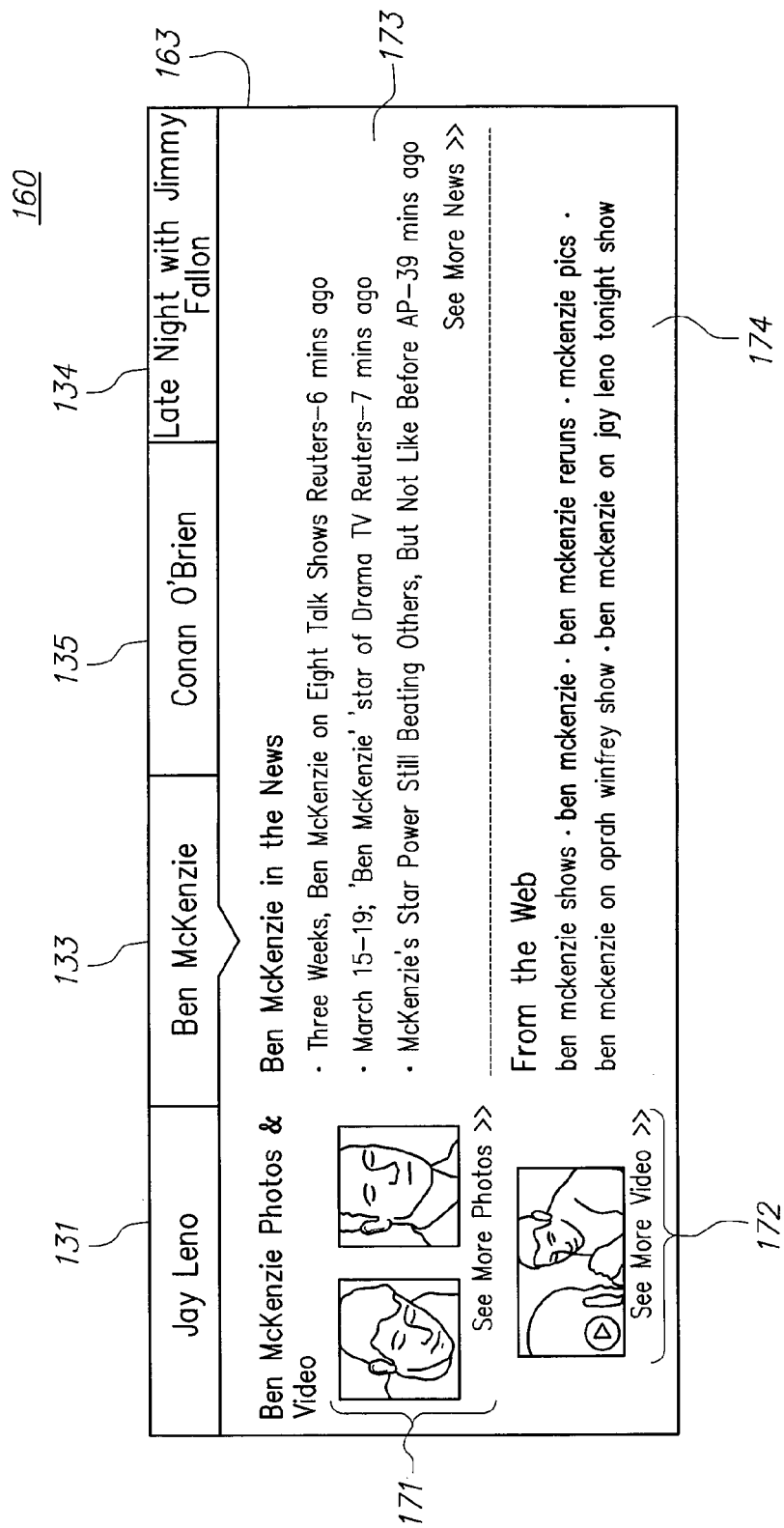
FIGS. 1B and 1C are alternative examples of supplements that may be presented with an article content.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview
  2.0. Example Display of Supplemental Content
  3.0. Structural Overview
  4.0. Functional Overview
    4.1. Server-Initiated Supplementation
    4.2. Client-Initiated Supplementation
    4.3. Generating Supplements
  5.0. Implementation Examples
    5.1. Selecting Primary Entities
    5.2. Selecting Related Entities
    5.3. Selecting a Final Set of Entities from Candidate Entities
    5.4. Filtering Entities for Quality-Based Criteria
    5.5. Formatting the Supplemental Content 5.6. User Personalization
5.7. Monetization
5.8. Server Optmizations
5.9. Time Sensitivity
5.10. Supplement Server API
5.11. Miscellaneous
6.0. Implementation Mechanism—Hardware Overview
7.0. Extensions and Alternatives
1.0. General Overview Approaches, techniques, and mechanisms are disclosed for enhancing a user's browsing experience by supplementing content accessed by the user with dynamically-determined snippets of contextually relevant or related content, such as videos, images, definitions, maps, search results, related links, and so on. These "snippets," hereafter referred to as "supplemental content" or "supplements" not only identify entities of interest, but also include information of interest about those entities, obtained from search results based on those entities. In an embodiment, the supplements thereby engage users in a search experience without the user having to take potentially inconvenient steps such as sending a query to a search engine, and without the need for editorial programming on behalf of the content provider.

The supplemental content is generated based at least in part on an analysis of the content accessed by the user. According to an embodiment, each supplement comprises information about one or more entities selected based at least in part on the analysis. Each entity is a word, term, or phrase that appears in, or is related to, the analyzed content. The information about the one or more entities is generated by performing searches for the one or more entities in one or more search engines and/or databases. A supplement may additionally comprise other information unrelated to the analyzed content, such as user-targeted advertisements.

According to an embodiment, each supplement comprises at least one federated search report, the federated search report comprising search results generated by searching for the one or more entities in one or more search engines and/or databases. In an embodiment, each federated search report comprises multiple subsections, each subsection comprising information gathered from search results against a different category of data. For example, a federated search report may include a subsection for one or more search results against one or more video repositories, another subsection for one or more search results against one or more repositories of image data, another subsection for one or more search results against one or more repositories of news articles, and another subsection for one or more search results against one or more repositories of social media data. However, in other embodiments, different results from different repositories may be comingled in a single subsection.

According to an embodiment, each supplement comprises a plurality of sections, each generated for a different entity selected for the article. Each section may include, for example, a federated search report for its respective entity. For example, suppose four entities were identified for an article reporting on a World Cup soccer match: soccer, World Cup, South Africa, and USA. The supplement generated for the article may contain four different sections, each containing a different federated search report for a different one of the four identified entities.

In an embodiment, a supplement is displayed in association with an article of content from which it was derived. For example, each supplement is displayed within a same web page as the article for which the supplement was generated—either in a sidebar, above the article, or below the article. In an embodiment, each supplement comprises scripts, code, or other instructions that cause a client displaying the supplement to only display one section corresponding to one entity at any given time. The instructions may also cause the client to display tabs or other controls for making visible other sections corresponding to different entities. However, the information in a supplement may be displayed in a variety of other manners.

In an embodiment, entities are selected for an article based on a number of analyses and ranking processes. For example, primary entities may be extracted from the article and then ranked according to any number of algorithms for quantifying the extent to which the primary entities reflect the subject of the article. As another example, related entities may be selected based on searches for primary entities in repositories of related terms. The related entities may then be ranked based on any of a number of algorithms for measuring their relevance to the primary entities. Both primary entities and related entities may then be pooled and further ranked with respect to each other. At some or all ranking stages, entities may further or instead be ranked based on a variety of factors, including: measurements of the relevance of each entity to the article; measurements of the relevance of each entity to a user; measurements of the popularity of each entity as indicated by recent search, news, or social media trends; measurements of the usefulness of search results obtained for each entity; and so on. At some or all ranking stages, certain entities may be eliminated from consideration for inclusion in the supplement based on the ranking process. For example, after some or all of the ranking stages only a pre-defined number of entities may be selected. As another example, only entities having a relevance score above a pre-defined threshold may be selected.

In an embodiment, a supplement is generated for a particular article of content dynamically, in response to the user requesting the article of content, as a result of server-side or client-side instructions that are executed in response to the user's request. In an embodiment, a search provider provides a supplement generation service whereby content developers, content hosters, content display applications, and/or background applications may submit articles of content and receive, in return, supplements generated for that content. For example, a web hosting provider may automatically feed a web page it hosts through the supplement generation service when the web page is requested by a browser, prior to returning the web page to the browser. The web hosting provider is thereby empowered to automatically insert context-sensitive supplemental content into any page it hosts, without having to manually identify relevant information for the supplemental content. As another example, a user may be provided with a browser toolbar that, upon selection of a control in the toolbar, sends a web page (or web page address) being currently viewed by the user to the supplement generation service. In return, the toolbar receives supplemental content for display to the user.

In other aspects, the invention encompasses a computer apparatus and a computer-readable medium configured to carry out the foregoing steps.

2.0. Example Display of Supplemental Content

FIG. 1A is an example screenshot depicting a display 100 of an article of content 110 and an accompanying supplement 120. Display 100 may be, for example, of a web page in which the article 110 and supplement 120 are embedded. Article of content 110 is a news article, and includes both text 112 and an image 114. Supplement 120 is displayed at the end of article 110. Text 112 comprises, among other elements, primary entities 131 ("Jay Leno"), 132 ("David Letterman"), and 135 ("Conan O'Brien"). Primary entities 131 and 132, as well as related entities 133 ("Ben McKenzie") and 134 ("Late Night with Jimmy Fallon"), were selected to generate supplement 120. Entities 131-134 are thus displayed in a header bar at the top of supplement 120. The remaining visible portion of supplement 120 is a section 143 of information about related entity 133. However, upon selecting any of entities 131, 133, or 134, section 143 may be replaced with a hidden section of supplement 120 that corresponds to the selected entity 131, 133, or 134.

Section 143 comprises four subsections 151-154, each of which reflects search results from a different repository of information. Subsection 151 displays the title and abstract of a news article retrieved by searching for primary entity 133 in a news database. Subsection 152 displays a video preview and title based on information about a video retrieved by searching for primary entity 133 in a video database. Subsection 153 displays an image and image metadata retrieved by searching for primary entity 133 in an image database. Subsection 154 displays a slideshow preview and metadata retrieved by searching for primary entity 133 in a database of slideshows. Portions of each of subsections 151-154 are selectable, in that upon selecting a highlighted portion of a particular subsection of subsections 151-154 by, for example, clicking on it, the user is taken to more detailed data, such as a complete video, news article, or slideshow. While each of subsections 151-154 include information derived from only one search result, in other embodiments, each subsection may include information derived from any number of search results.

Supplement 120 further comprises a navigation bar 129, which allows a user to scroll through section 143 to bring up additional subsections of information.

Figure 1C:
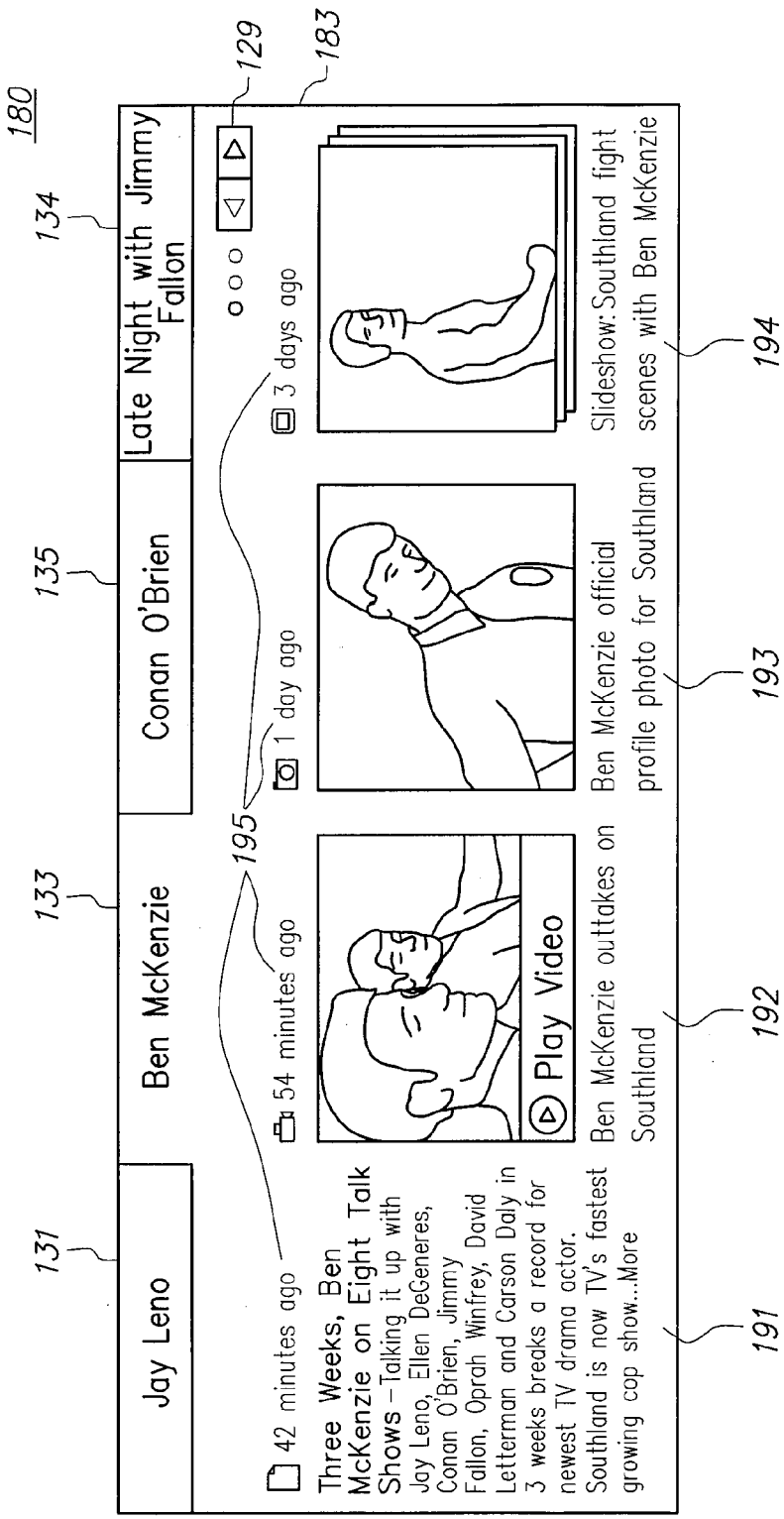

FIGS. 1B and 1C are alternative examples of supplements 160 and 180 that may be presented in place of supplement 120 for article 110. FIG. 1B depicts a supplement 160 that includes a different set of entities—primary entity 131, related entities 133 and 134, and primary entity 135. Primary entity 135 may have been selected for supplement 160 instead of primary entity 132 for a variety of reasons, including user personalization, the time sensitivity of the data used to compute relevance, and monetary factors.

Section 163 of FIG. 1B comprises a different set of subsections 171-174 than section 143 of FIG. 1. Subsections 171-174 correspond to search results against, respectively, a repository of images, a repository of photos, a repository of news articles, and a repository of popular search queries. Subsection 171 comprises a plurality of images, while subsection 172 comprises an inline video. Subsections 173 and 174 include a plurality of links, each corresponding to a different search result. Subsections 171-173 each include a link 165 for obtaining more search results from their respective repositories.

FIG. 1C depicts a supplement 180 that includes the same entities as supplement 120 of FIG. 1B, but whose section 183 includes subsections 191-194 that are similar to subsections 151-154 of section 143 of FIG. 1A. Subsections 191-194 differ from subsections 151-154 chiefly in that they each include timestamps 195 indicating the time at which their respective items were created or modified. Subsections 191-194 are sorted by how recently their top-ranked result was created.

FIGS. 1A-C depict but one manner in which a supplement 120 may be presented to a user. In other embodiments, the supplement 120 may appear at different positions within the web page relative to the article 110, or may appear in a pop-up window, external window, or separate display. For example, supplement 120 may be displayed by a toolbar or desktop widget. The information within supplement 120 may be organized in any number of possible layouts. For example, additional or even all of the entity sections within supplement 120 may be visible within the supplement without clicking or scrolling. Furthermore, the information within supplement 120 may vary depending on factors such as the entities selected for the supplement, the nature of the information available for each entity, and the user viewing the article 110. In an embodiment, a section 143 may not necessarily be divided into subsections, but include a single subsection in which the top-ranked search results are presented, regardless of their source.

3.0. Structural Overview

Figure 2:
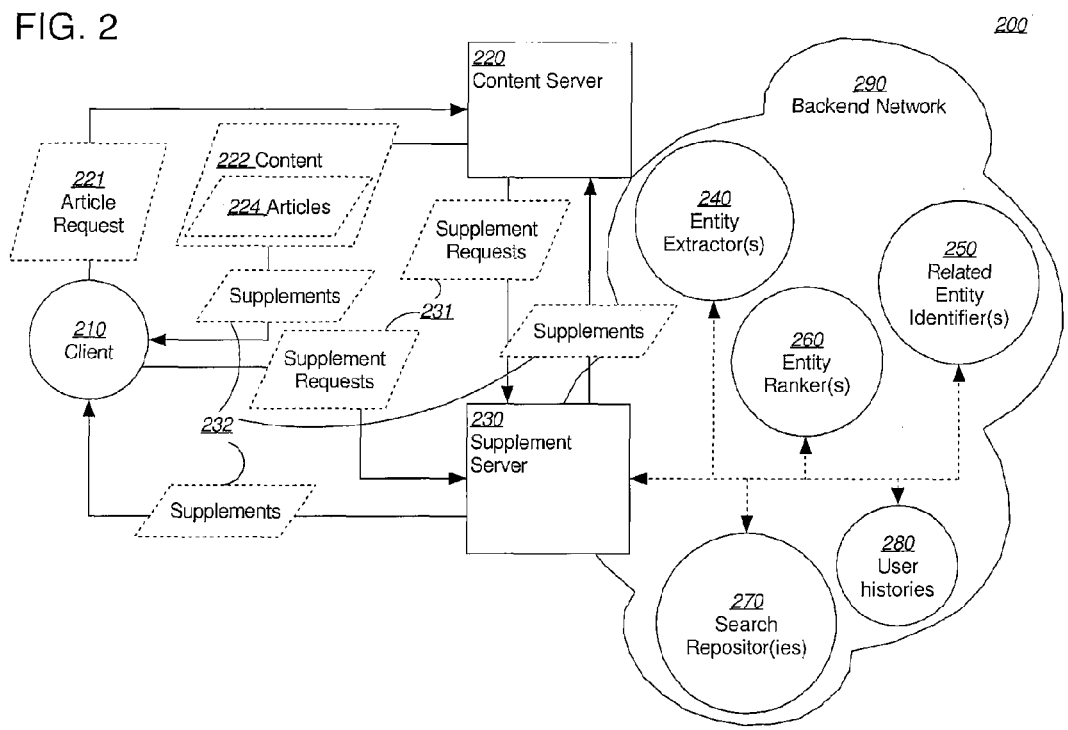
FIG. 2 illustrates an example system in which the techniques described herein may be practiced.

FIG. 2 illustrates an example system 200 in which the techniques described herein may be practiced. System 200 comprises a client 210, content server 220, supplement server 230, entity extraction component 240, one or more related entity identification components 250, one or more entity ranking components 260, one or more search components 270, and one or more user history components 280. Other systems in which the techniques described herein may be practiced may include similar elements in alternative arrangements and/or additional or omitted elements.

A user operates client 210 to access content 222 provided by content server 220. For example, client 210 may be a web browser that presents content 222 in the form of web pages to the user, while content server 220 may be a web server responsible for sending those web pages to client 210. Client 210 sends requests 221 to download distinct articles 224 of content 222 from content server 220. Articles 224 are specific items of user-generated content, include text, images, and videos. Some or all of articles 224 may be complete user-written compositions such as blog entries, news articles, reference articles, reviews, instructional documents, emails, and so forth.

Content server 220 responds to requests 221 by transmitting articles 224. In an embodiment, each article 224 is transmitted to client 210 within a structured object such as a Hyper-text Markup Language (HTML) file or an element of an Extended Markup Language (XML) stream. Each structured object may include other elements in addition to an article 224. These elements may include, without limitation: media items that illustrate or are related to the article, such as pictures or videos; formatting instructions that affect client 210's presentation of the article 224; navigational components such as headers, footers, and sidebars; advertisements; article metadata; and coded instructions for causing client 210 to perform various actions.

Content server 220 may or may not be responsible for inserting each article 224 into a structured object. For example, content server 220 may maintain a repository of articles 224 in a database or file system. When a specific article 224 is requested, content server 220 retrieves the requested article 224, generates an appropriate structured object (including, for example, markup instructions and navigational components), inserts the requested article 224 into the structured object, and replies to the request with the structured object. Conversely, content server 220 may relay an article 224 to client 210 without any processing when article 224 is already stored at content server 220 within a suitable structured object (e.g. a web page).

One or both of client 210 and content server 220 send requests 231 for supplements 232 to supplement server 230. In response, the supplement server returns supplements 232 for displaying with content 222. Each supplement 232 is a collection of information about one or more entities within or related to a specific article 224 of content 222. The information may take the form of search results obtained, for example, by querying or performing any other type of lookup operation against one or more repositories using the one or more entities. In an embodiment, each supplement 232 comprises federated search results for a plurality of entities. The federated search results may include, for example, images, videos, links to related content, reference data, contact information, maps, and so on. Each supplement 232 is returned within a single data structure—for example a single data stream, or a single HTML or XML element.

Supplement server 230 generates at least some of supplements 232 dynamically, based on articles 224 that are indicated to the supplement server 230 on-the-fly from client 210 or content server 220. Once generated, supplement server 230 may also cache a supplement 232 for serving in response to future requests for supplements for the particular article 224 for which the supplement 232 was generated.

To generate a supplement 232, supplement server 230 may employ a variety of backend components. Supplement server 230 may rely on one or more entity extraction components 240 to extract entities from an article. Entity extraction components 240 may take a variety of forms, as long as they are capable of inputting an article and outputting a plurality of entities extracted from that article. One example of a suitable entity extraction component is Yahoo Inc.'s Contextual Analysis Platform (hereinafter "CAP"). Another is the Stanford Named Entity Recognizer.

Supplement server 230 may further rely on one or more related entity identification components 250. Again, the one or more related entity identification components 250 may take a variety of forms, as long as they are capable of outputting one or more related entities based on input such as an extracted entity, media item, or at least a portion of an article. In an embodiment, the one or more related entity identification components 250 include at least three systems that determine relatedness by analyzing, respectively, search query logs, human-entered relationship data, and contents of a corpus of articles. Examples of such systems include, respectively: Yahoo, Inc.'s Seaview system, the Wikipedia database, which includes human populated categorical data that defines relationships between various titled reference entries; and social interest discovery systems that define time-decay category co-occurrence frequencies of various entity pairs in a corpus of articles, such as described in U.S. Pub. No. 2009/0083278, the entire contents of which are hereinafter incorporated by reference for all purposes as if set forth in their entirety.

Supplement server 230 may further rely upon one or more entity ranking components 260 to provide entity relevance scores or rankings. Supplement server 230 may use these scores or rankings to prioritize and filter entities, so that supplements 232 comprise information about only the most contextually relevant of entities within or related to their corresponding articles 224. Supplemental server 230 may rely on the one or more entity ranking components 260 for a variety of purposes, including some or all of: limiting the number of extracted entities used to identify related entities; limiting the number of related entities identified for a particular extracted entity; and limiting the number of extracted and related entities for which information is provided in a supplement 232. Some or all of the one or more entity ranking components 260 may be logically integrated into the entity extraction component 240 or the one or more related entity identification components 250. For example, supplement server 230 may utilize ranking functions provided by CAP. Or some or all of the one or more entity ranking components 260 may be logically independent. For example, supplement server 230 may utilize its own custom ranking functions, or query a trending system such as described in the afore-mentioned "Activity Based Users' Interests Modeling For Determining Content Relevance."

The one or more ranking components 260 may rely upon data from a variety of sources, and may be optimized to determine relevance for any number of objectives. For example, the one or more ranking components 260 may be optimized to rank entities for a particular supplement 232 based on how likely those entities are to produce search results that a particular user of client 210 will "click-through" when viewing the supplement 232. As another example, the one or more ranking components 260 may be optimized to rank entities based on their popularity in recent news or trending data.

Supplement server 230 may further rely upon one or more search components 270 for generating search results for the entities described in supplements 232. The one or more search components may include any number of search engines, databases, and other repositories, hereinafter collectively referred to as search repositories. Some or all of the different search repositories may comprise different types of searchable data. For example, each repository may correspond to a "search vertical"—e.g., web search, images, videos, news, and so forth. In an embodiment, each search repository is a separate search engine or database. In an embodiment, some or all of the search repositories are simply differently-categorized sets of data within a same engine or database.

In an embodiment, one or more search components 270 may further include a search result customization component, such as Yahoo Inc.'s Query Planner. The customization component may be responsible for a variety of tasks, including planning which search engines or data repositories to query for information about an entity, organizing the layout of federated search results, and indicating which entities do not produce search results that meet specified thresholds for quality or quantity.

Supplement server 230 may further rely upon one or more user history components 280 to tailor supplements 232 to a particular user 212. For instance, supplement server 240 may utilize data provided by user history components 280 as features for ranking functions executed by the one or more ranking components 260. The one or more user history components 280 may include, for example, user search and search session histories, as well as general user browsing histories.

In an embodiment, content server 220 and supplement server 230 execute on different devices. Content server 220 executes on one or more devices operated by a content provider that provides content 222 (or a web hosting provider on behalf of a content provider). Supplement server 230 executes on one or more devices operated by a supplement provider that is different than the content provider. In an embodiment, the supplement provider is also a search provider that provides some or all of the various components 240-280. Thus, some or all of the components 240-280 may execute on other devices operated by the search provider, may execute on the same one or more devices as supplement server 230, or may even be logically integrated into supplement server 230. The components may all be connected to the server via the search provider's backend network 290. In an embodiment, some or all of the components upon which supplement server 230 relies are provided by entities other than the search provider, and accordingly are executed on devices other than the one or more devices upon which supplement server 230 executes, and are connected to supplement server 230 via networks other than network 290.

As used herein, the term "server" is not limited to a single server component executing at a single computing device, but may also refer to multiple server components that execute at multiple computing devices to collectively provide the functionality described as being provided by the server. Likewise, the term "component" may refer to, for example, a single instance of instructions being executed at a single computing device, or multiple instances of instructions executing at multiple computing devices.

4.0. Functional Overview 4.1. Server-Initiated Supplementation

Figure 3:
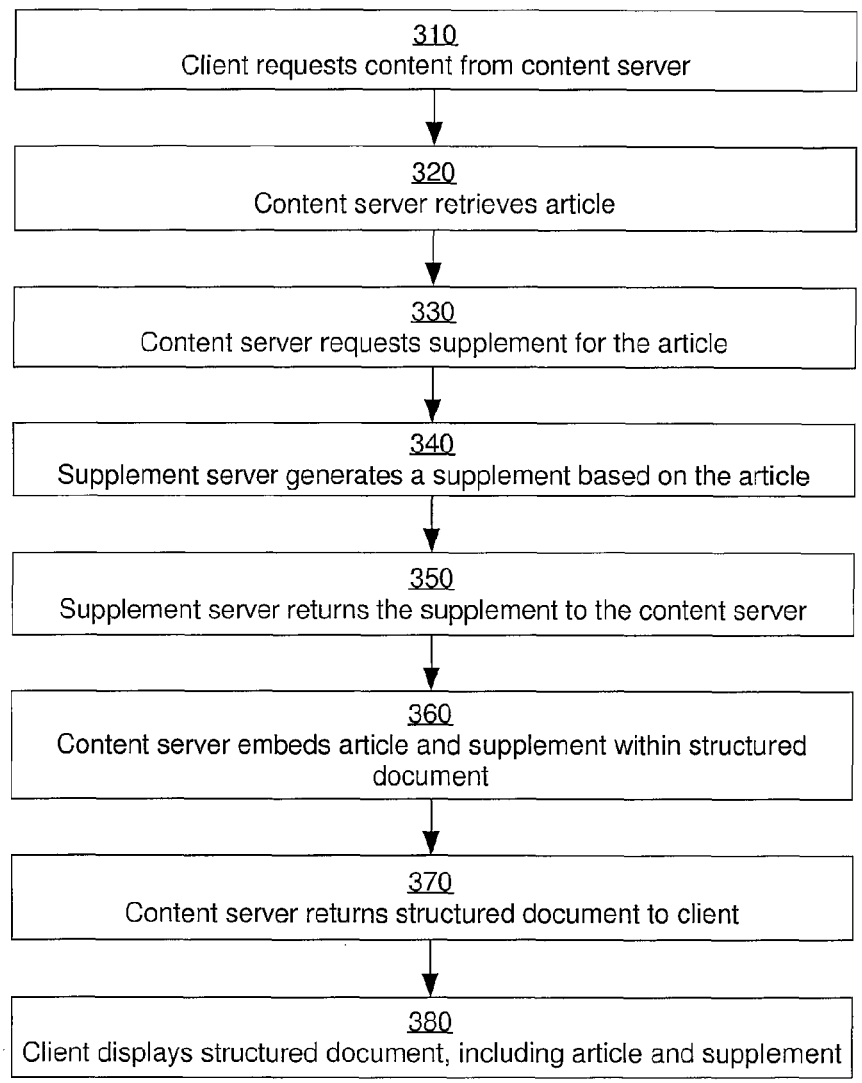
FIG. 3 is a flow diagram that illustrates an example technique for providing a user with a supplemented article of content.

FIG. 3 is a flow diagram 300 that illustrates an example technique for providing a user with a supplemented article of content. Flow diagram 300 illustrates but one example of a process for providing supplemental content. Other processes may involve more, fewer, or different steps, arranged in the same or different orders.

At step 310, a client for displaying content, such as client 210, sends a request to a content server, such as content server 220, for an article of content. For example, a user may operate a web browser to request a web page comprising the article from a web server.

At step 320, in response to the request, the content server retrieves the article. For example, the content server may retrieve the article from one or more databases or storage devices.

At step 330, the content server requests a supplement for the article from a supplement server, such as supplement server 230. For example, the supplement server may expose an application programmatic interface (API) for receiving such requests. In accordance with the API, the content server may include with the request data indicating the article for which the supplement is requested, including the article itself and/or a reference to the article, such as a file path, database record identifier, or uniform resource locator specifying a location from which the article may be retrieved.

At step 340, in response to the request of step 330, the supplement server generates a supplement based on the article. The supplement server does so, in part, by querying for information from any number of search repositories. The supplement server bases its queries on entities selected as a result of any number of analyses of the article's contents, ranking processes, and/or filtering processes. Techniques for generating a supplement are discussed in greater detail throughout this disclosure.

At step 350, the supplement server returns the supplement to the content server. For example, the supplement server may return the supplement in the form of a snippet of HTML code that embeds and formats the information retrieved from the search repositories for the selected entities.

At step 360, upon receiving the supplement, the content server generates a structured document that includes at least the article and the supplement. The structured document in which the article and the supplement are returned may additionally include other items for display by the client, as well as instructions for how to format and display the items within the structured document. For example, the content server may generate an HTML document comprised of the article's contents, a sidebar containing the supplement, JavaScript instructions for dynamically changing various aspects of the displayed page, and various navigational or decorative components. The content server may generate the structured document, for example, by inputting the article, the sidebar, a template, and other information into a page rendering component.

At step 370, upon generating the structured document, the content server responds to the request of step 330 by sending the structured document comprising the article to the client.

At step 380, based on the structured document received in step 370, the client displays the article's contents and the supplement. For example, where the structured document is a web page, the client may parse the web page and, based on markup and other instructions, render at least the article and the supplement for display to a user operating the client.

4.2. Client-Initiated Supplementation

Figure 4:
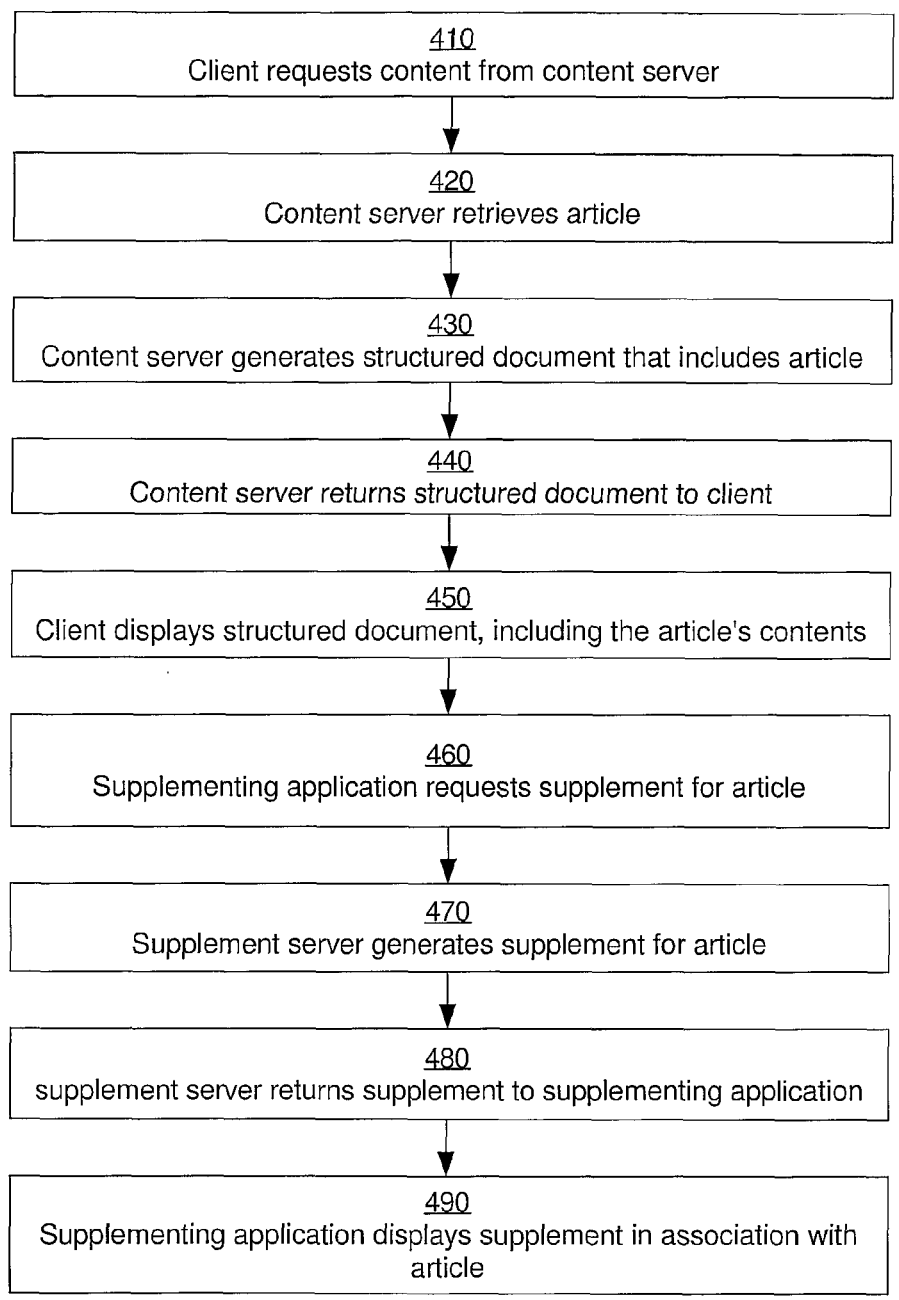
FIG. 4 is a flow diagram that illustrates another example method for providing a user with a supplemented article of content.

FIG. 4 is a flow diagram 400 that illustrates an example method for providing a user with a supplemented article of content. Flow diagram 400 illustrates but a second example of a process for providing supplemental content. Still other processes may involve more, fewer, or different steps, arranged in the same or different orders.

At step 410, a client for displaying content, such as client 210, sends a request to a content server, such as content server 220, for an article of content. For example, a user may operate a web browser to request a web page from a web server.

At step 420, in response to the request, the content server retrieves the article. For example, the content server may retrieve the article from one or more databases or storage devices.

At step 430, upon retrieving the article, the content server generates a structured document that includes at least the article. For example, the content server may embed the article's contents within a web page along with headers, footers, sidebars, and/or other navigational or decorative items. Alternatively, the article may have already been stored within a suitable structured document, making this step unnecessary.

At step 440, the content server responds to the request of step 420 by sending the structured document comprising the article to the client.

At step 450, based on the structured document received in step 370, the client displays the article's contents. For example, where the structured document is a web page, the client may parse the web page and, based on markup and other instructions, render at least the article for display to a user operating the client.

At step 460, a supplementing application—either the client or another application operating in association with client—sends a request for a supplement for the article to a supplement server, such as supplement server 230. For example, the supplement server may expose an application programmatic interface (API) for receiving such requests. In accordance with the API, the supplementing application may include with the request data indicating the article for which the supplement is requested, including the contents of the article and/or a reference to the article, such as a file path, database record identifier, or uniform resource locator specifying a location from which the article may be retrieved.

At step 470, the supplement server generates a supplement based on the article, as explained with respect to step 340 and throughout this disclosure.

At step 480, the supplement server returns the supplement to the supplementing application. In an embodiment, the supplement is returned formatted as HTML and/or scripted instructions.

At step 490, the supplementing application displays the supplement in association with the article. Step 490 may occur in conjunction with step 450 are at any time thereafter.

In an embodiment, the client or a client plug-in component acts as the supplementing application of steps 460-490. For example, the client may assume this role in response to instructions from within the structured document. The structured document may include a script that instructs the client to identify the article within the structured document, send the request for a supplement to the supplement server, and then display the supplement within a dynamically loaded section of the page or a pop-up window. The instructions may be executed automatically as the client renders the structured document, or in response to user selection of a control—such as a button or link—within the web page or within the client's interface. Alternatively, the client or the client plug-in component may be hard-coded to execute similar instructions.

In an embodiment, another application executing at the same computing device as the client acts as the supplementing application. The other application may be, for example, a background application executing on a mobile device, a widget executing on a desktop computer, or any other suitable application. The other application is configured to communicate with the client to identify an article of content currently being displayed by the client. The other application then sends a request for a supplement to the supplement server. Upon receiving the supplement in return, the other application displays the supplement in another window at the computing device. The window may be displayed alongside the client's display of the article, or it may entirely replace the client's display of the article. The other application may identify the article, request the supplement, and/or display the supplement in response to user input. Or, the other application may be configured to automatically perform some or all of these steps for any article of content the client displays.

4.3. Generating Supplements

FIG. 5 is a flow diagram 500 illustrating an example technique for generating supplemental content for an article of content. The steps of flow diagram 500 may be implemented, for example, by a supplement server to generate a supplement in accordance with step 470 of FIG. 4 or step 340 of FIG. 3. Flow diagram 500 illustrates but one example of a process for generating supplemental content. Other processes may involve more, fewer, or different steps, arranged in the same or different orders.

At step 510, a server, such as supplement server 230, extracts a plurality of constituent entities from content or metadata for an article. Each constituent entity in the plurality of constituent entities is a different entity that appears within the content or the metadata. A variety of techniques may be used to extract entities from content. In an embodiment, each unique word in the article is considered a constituent entity. In an embodiment, constituent entities may be identified using a syntactic and/or semantic analysis of the content to identify statistically significant words or phrases. In an embodiment, all unique proper nouns within an article are identified as constituent entities. In an embodiment, constituent entities are identified by looking up words or combination of words in a dictionary of pre-defined entities of interest. Other variations may rely upon additional analyses as well as combinations of the above-described embodiments.

At step 520, the server selects a set of primary entities from the plurality of constituent entities. To do so, the server may pass each entity through one or more ranking processes. The processes produce scores for each constituent entity and/or a ranked list of the constituent entities. The ranking may be based on a number of factors, including, without limitation, the position of each entity within the article, the frequency with which the entity appears within the content, the linguistic structure of the sentences within which the entity appears, and an entity type to which the entity is classified as belonging—for example, person name, organization name, or place name. In an embodiment, the ranking indicates, at least in part, a measure of "aboutness" of the entity—that is, a measure of how relevant the entity is to the article as a whole, in that removing the entity from the article's content results in the loss of the main topics or subjects of the content. The ranking may also or instead function to quantify other aspects of each entity, such as the relevance of the entity to a user or a group or users, or the pertinence of the entity to recent news topics. In an embodiment, only a predefined number of the highest ranked primary entities are selected. In an embodiment, only primary entities having been scored higher than a threshold score are selected.

At step 530, the server identifies a set of related entities based on the article. For example, the server may lookup related entities for each entity in the set of primary entities in one or more databases of related entities. As another example, the server may feed the entire article, the set of constituent entities, or the set of primary entities, to one or more related entity identification components, such as related entity identification components 250.

In an embodiment, the set of related entities is identified by first identifying a set of candidate related entities, and then filtering the set of candidate related entities based on one or more ranking processes. The processes produce scores for each related entity and/or one or more ranked lists of the related entities. The ranking of the related entities may be based on a number of factors, as discussed throughout this application. In an embodiment, each related entity is ranked at least partially based on measures of its relatedness to the primary entity for which it was discovered. Factors in such measurements may include, without limitation: categorizations of the primary entity and the related entity, the frequency with which both terms appear in logged data for the same search session, and the frequency with which both terms appear in the same document within a set of documents. In an embodiment, only a predefined number of the highest ranked related entities are selected for each primary entity. In an embodiment, only related entities having been scored higher than a threshold score are selected.

At step 540, the server pools the set of one or more primary entities and the set of one or more related entities to form a set of candidate entities that are candidates for inclusion in supplemental content for the article.

At step 550, the server ranks each entity in the set of candidate entities to produce scores for each candidate entity and/or a ranked list of the candidate entities. Again, the server may rely upon a variety of ranking processes. In an embodiment, the server may employ different ranking processes for different objectives, including ranking to optimize for click-through rate, ranking to optimize entity coverage across a larger set of articles, or ranking to optimize revenues from advertisements or search results. The ranking processes may be based on a variety of factors, including, without limitation, search revenue associated with the entity, a primary entity "aboutness" score, a relatedness rank of related entities to their respective primary entity, relevance to a particular user or group of users, the frequency with which search results for each entity have been presented and/or clicked on in supplements previously provided by the server, and time-sensitive measures of each entity's popularity, as indicated by the frequency of each entity's appearance in search logs, browsing histories, and recent news or social media articles. Note that some of these factors may also play a role in ranking constituent entities or candidate related entities.

At step 560, the server filters the set of candidate entities based at least upon the ranking of step 550 to produce a final set of entities. In an embodiment, only a predefined number of the highest ranked candidate entities are selected for the final set of entities. In an embodiment, only candidate entities having been scored higher than a threshold score are selected.

In an embodiment, additional filters are employed in identifying the final set of entities. For example, the server may, starting with the highest ranked candidate entity and continuing until a predefined number of entities have been selected, process each entity to ensure that it meets certain criteria. If the entity meets the predefined criteria, it is selected into the final set of entities. The predefined criteria may include, for example, the quality of search results obtained for the entity (e.g. a measure of the relevancy of the search results to the entity), the number of search results obtained for the entity, the number of search results obtained for each of a set of pre-defined categories of search results (e.g. the server may require that each final entity have at least one video, two picture, and three news search results), whether the search results include at least a predefined number of hits for certain target domains (e.g. news organizations, high-revenue domains, or domains favored by the user), and whether the search avoids too many search results for certain target domains (e.g. domains that have been returned too frequently in recent search results or domains identified as low-quality and/or malicious).

In an embodiment, the above mentioned filtering steps may also or instead be performed when selecting primary and/or related entities.

At step 570, for each particular entity in the final set of entities, the server executes one or more queries against one or more search repositories, using the particular entity as the search term. For example, the server may search for each entity in the final set of entities in a repository of videos, a repository of web pages, and a Wikipedia database. Other possible repositories in which the server may perform searches in accordance with this step include, without limitation, repositories of videos, images, web pages, audio files, news articles, social media, blog entries, movie metadata, event calendars, stock quotes, maps, sports scores, shipment tracking data, dictionary entries, reference entries, and so on.

In an embodiment, the repositories searched are pre-defined. In an embodiment, the search repositories may be specified by an entity requesting the supplement from the server. In an embodiment, the repositories may vary depending upon a type or topical categorization of the article for which the supplement is being generated. In an embodiment, the repositories vary depending upon the entity itself. For example, the server may send the entity to a query planning component that determines, out of a number of predefined repositories, which repositories produce optimal search results based on factors such as relevance, user preferences, and revenue. For example, the query planning unit may determine that searches in each of a video, music, and social media repository may be optimal for a "Black Eyed Peas" entity, but determine that searches against a Wikipedia database and a corpus of news articles would be optimal for a "Ghana" entity.

At step 580, the server generates the supplement by organizing and formatting some or all of the information retrieved as a result of the server executing the one or more queries for each of the entities in the final set of entities. The server generates a section for each entity, with each section including at least some of the search results obtained for that entity. The sections may be organized, for example, in accordance with the ranking of step 550, so that the most relevant section is listed first and/or made visible first. Or, the sections may be organized based on some other ordering—for example, user preferences and/or advertising revenue. The server performs the formatting according to various templates or layouts rules, thereby generating a supplement for the article. Example techniques for formatting information as a supplement are discussed in other sections of the disclosure. The formatting may be offloaded to, for example, a federated search component.

5.0. Implementation Examples 5.1. Selecting Primary Entities

Figure 6:
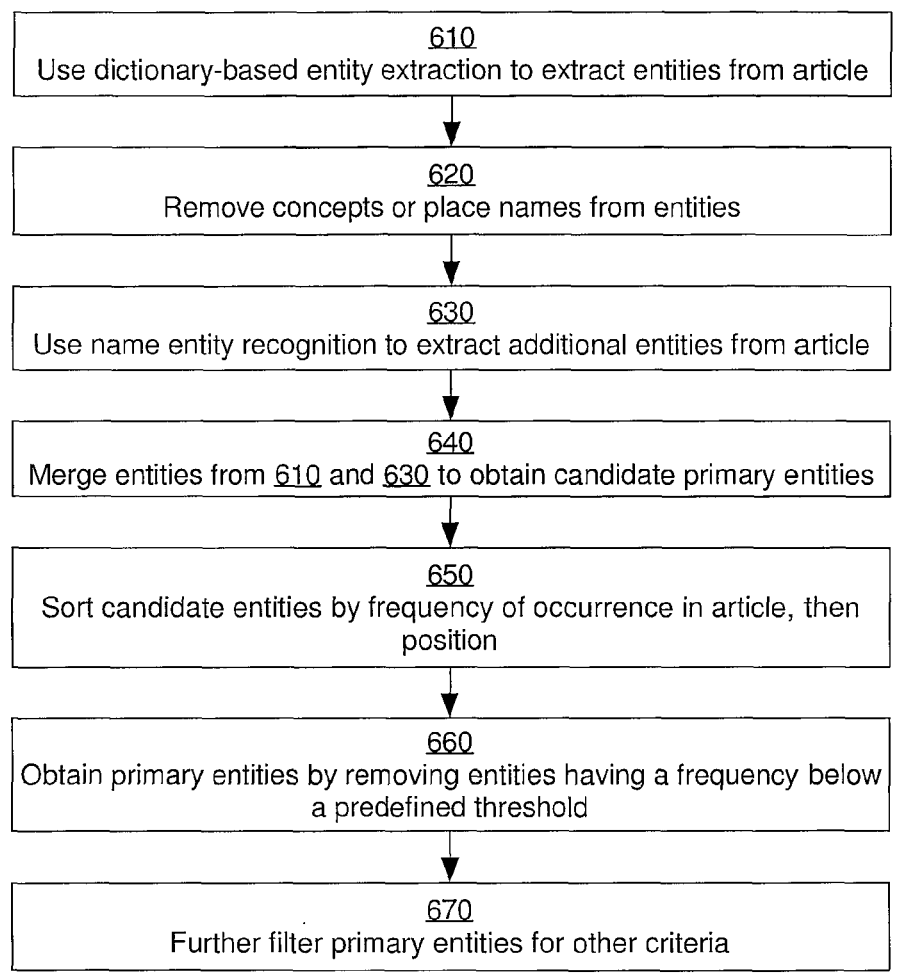
FIG. 6 is a flow diagram illustrating an example technique for selecting primary entities.

FIG. 6 is a flow diagram 600 illustrating an example technique for selecting primary entities. The steps of flow diagram 600 may be implemented, for example, by a supplement server working in coordination with one or more entity extraction components to identify and select primary entities in accordance with steps 510 and 520 of FIG. 5. Flow diagram 600 illustrates but one example of a process for identifying primary entities. Other processes may involve more, fewer, or different steps, arranged in the same or different orders.

At step 610, a supplement server utilizes a dictionary-based entity extraction component to extract a first set of entities from an article. An example of such a component is the aforementioned CAP, but any dictionary-based extraction component may be used. The dictionary-based extraction component may parse the article's contents, looking for entities stored within a database of pre-defined entities. The extraction component may optionally rank and/or filter the entities.

At step 620, the supplement server optionally removes from the first set of entities entities that have been categorized as concepts or place names.

At step 630, the supplement server utilizes a name entity recognition component to extract an additional second set of entities from the article. An example of such a component is the grammar-based Stanford Named Entity Recognizer system, but any named entity recognition component may be used. The named entity recognition component relies upon various natural language processing techniques to recognize "named entities" in the article's contents, such as persons, organization, or places. The named entity recognition component complements the dictionary-based entity extraction component, in that both may capture entities that the other component may have missed.

At step 640, the supplement server merges the first set of entities and the second set of entities to produce a set of unique candidate primary entities.

At step 650, the candidate primary entities are sorted by their frequency of occurrence within the article, and then by their positions within the article.

At step 660, all entities having a frequency below a predefined threshold are removed from the set of candidate primary entities, thereby yielding a set of primary entities. For example, the set of primary entities may include only those entities occurring more than once in the article.

At step 670, the set of primary entities may further be filtered based on any number of other filtering criteria. For example, the set of primary entities may be filtered to include only those primary entities for which a related entity is identified, per the steps illustrated in FIG. 7.

5.2. Selecting Related Entities

Figure 7:
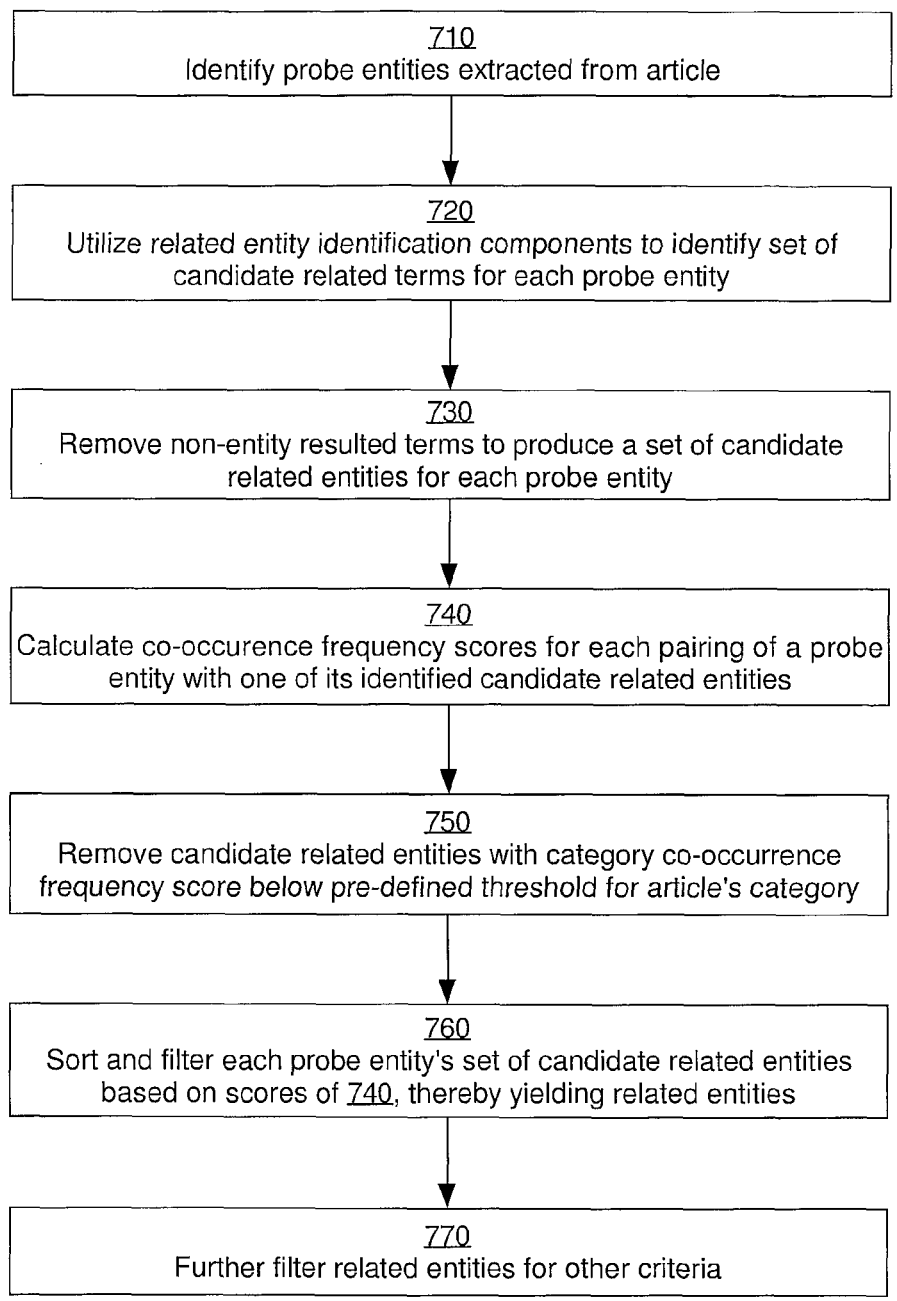
FIG. 7 is a flow diagram illustrating an example technique for selecting related entities.

FIG. 7 is a flow diagram 700 illustrating an example technique for selecting related entities. The steps of flow diagram 700 may be implemented, for example, by a supplement server working in coordination with one or more related entity identification components to identify and select related entities in accordance with step 530 of FIG. 5. Flow diagram 700 illustrates but one example of a process for identifying related entities. Other processes may involve more, fewer, or different steps, arranged in the same or different orders.

At step 710, a supplemental server identifies a set of probe entities extracted from an article for which to locate related entities. For example, the supplemental server may utilize as probe entities a set of primary entities identified per the steps of flow diagram 600.

At step 720, the supplemental server utilizes one or more related entity identification components to identify a set of candidate related terms for each entity in the set of probe entities. In an embodiment, at least three related entity identification components are utilized for each of the probe entities, three components being focused on, respectively—search query logs, human-entered relationship data, and contents of a corpus of articles collected for a given time period (e.g. the last six months).

At step 730, non-entity resulted terms are removed from each set of candidate related terms, thereby resulting in a set of candidate related entities for each of the probe entities. Non-entity resulted terms may be identified, for instance, via a dictionary look-up or a web search.

At step 740, for each probe entity in the set of probe entities, for each related entity in the probe entity's corresponding set of candidate related entities, the supplement server calculates a co-occurrence frequency score for the probe-related entity pair in the corpus of articles collected for the given time period. That is to say, each candidate related entity is scored based on the number of times the candidate related entity appears in the same document as the probe entity that located the related entity.

In an embodiment, separate category co-occurrence frequency scores are calculated for each of a plurality of categories of documents within the corpus of articles. The overall co-occurrence frequency score for a candidate related entity is then calculated based on the top category co-occurrence frequency scores—for example, the top three category co-occurrence frequency scores.

In an embodiment, time decay functions may used to calculate co-occurrence frequency scores, in that co-occurrence of a probe-related entity pair in recent documents is weighted more heavily than co-occurrence of the probe-related entity pair in less recent documents.

Optionally, at step 750, the supplement server filters out any candidate related entity that has a category co-occurrence frequency score below a pre-defined threshold for the category to which the article belongs. In an embodiment, the overall co-occurrence frequency scores in step 740 may be weighted heavily or entirely upon the category co-occurrence frequency score for the category to which the article belongs.

At step 760, each set of candidate related entities is filtered based on the co-occurrence frequency scores identified in step 740, thereby yielding a set of related entities for each probe entity. The superset of these sets may be used as a set of related entities for the purpose of, for example, step 530 of FIG. 5. For example, candidate related entities having co-occurrence frequency scores below a threshold score may be eliminated. Or, only the highest two related entities may be selected for a given probe entity.

At step 770, the set of related entities may further be filtered based on any number of other filtering criteria.

5.3. Selecting a Final Set of Entities from Candidate Entities

Figure 8:
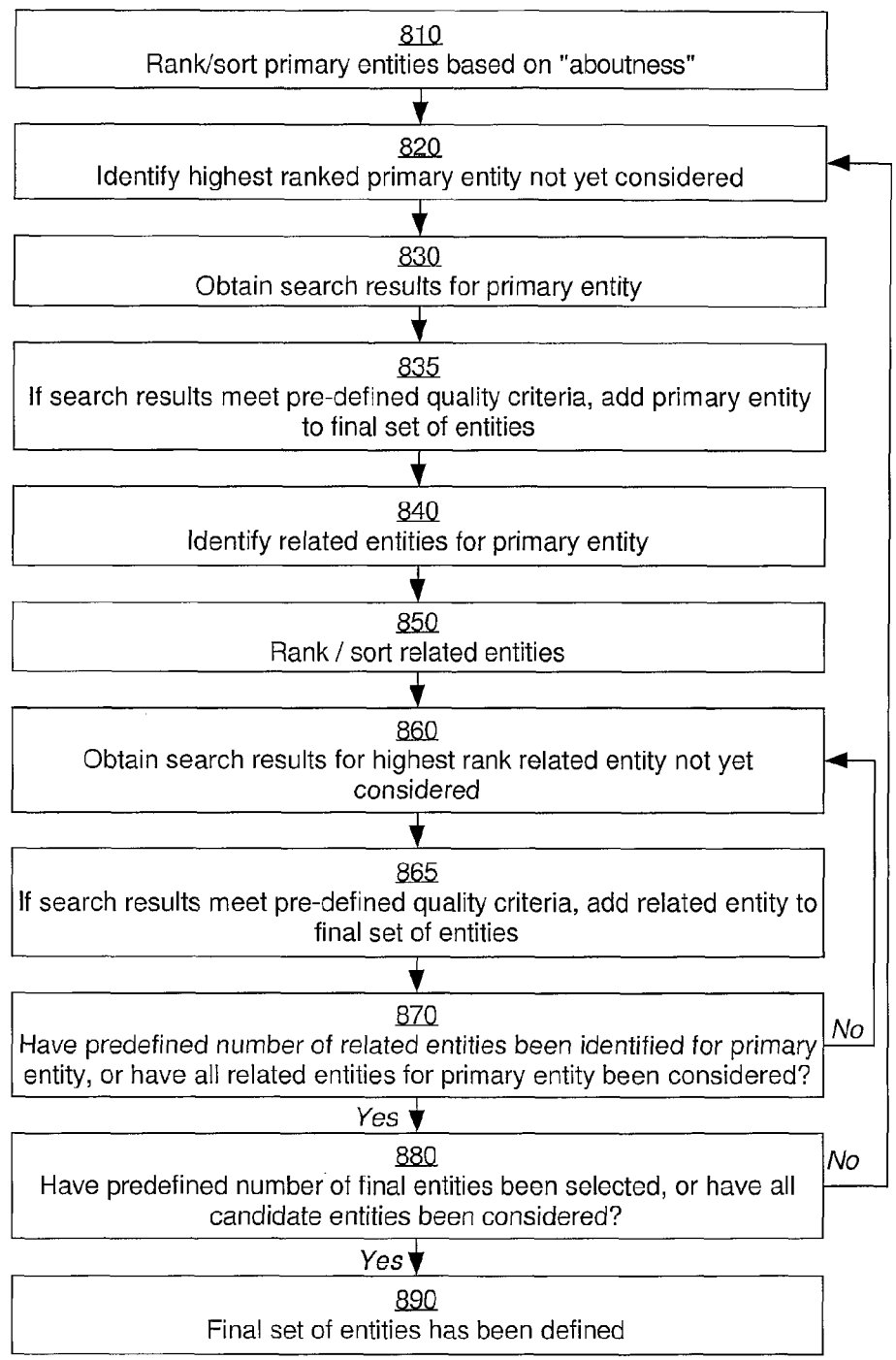
FIG. 8 is a flow diagram illustrating an example technique for selecting a final set of entities from a set of candidate entities that includes both primary entities and related entities identified for the primary entities.

FIG. 8 is a flow diagram 800 illustrating an example technique for selecting a final set of entities from a set of candidate entities that includes both primary entities and related entities that were identified for the primary entities. The steps of flow diagram 800 may be implemented, for example, by a supplement server working in coordination with one or more entity ranking components to rank entities in accordance with step 550 of FIG. 5. In an embodiment, some or all of the steps of flow diagram 800 may also or instead be performed when ranking candidate primary or related entities. Flow diagram 800 illustrates but one example of a process for selecting a final set of entities. Other processes may involve more, fewer, or different steps, arranged in the same or different orders.

At step 810, all primary entities—that is, all entities that appear within the article—are ranked according to an "aboutness" score or similar ranking score, as discussed in other sections.

At step 820, the supplement server identifies the candidate primary entity ranked highest in step 810. Or, in the event that step 820 is being performed after a first iteration of steps 820-880, the supplement server selects the highest ranked candidate primary entity that has not yet been considered.

At step 830, the supplement server obtains search results for the primary entity.

At step 835, if the search results obtained in step 830 meet certain predefined quality constraints, as discussed in other sections, the primary entity is added to the final set of entities.

At step 840, the supplement server identifies, in the set of candidate entities, a set of related entities that were located based on the primary entity of step 820.

At step 850, the set of related entities for the primary entities is ranked based on, for example, the co-occurrence ranking algorithm discussed in the previous section.

At step 860, the supplement server obtains search results for the highest ranked related entity that has not previously been considered.

At step 865, if the search results obtained in step 860 meet certain predefined quality constraints, as discussed in other sections, the related entity is added to the final set of entities.

At step 870, the supplement server determines whether a predefined number of entities in the set of related entities have been added to the final set of entities, or whether all entities in the set of related entities have been considered. If neither of these conditions is met, flow returns to step 860. Otherwise, flow proceeds to step 880. In an embodiment, the supplement server limits its consideration of related entities for any given particular entity only to the first related entity to produce search results meeting the predefined quality restraints. In an embodiment, no predefined number of related entities is defined, and steps 860 and 865 are repeated for all related entities associated with the particular entity.

At step 880, the supplement server determines whether a predefined number of candidate entities have been added to the final set of entities, or whether all candidate entities have been considered. If neither of these conditions is met, flow returns to step 820. Otherwise, flow proceeds to step 890. For example, the supplement server may limit the size of the final set of entities to four.

At step 890, the final set of entities is considered to be defined.

5.4. Filtering Entities for Quality-Based Criteria

According to an embodiment, the search quality constraints discussed in steps 865 and 835, as well as throughout this disclosure, may be based on any number of factors, including the number of search results returned altogether, the number of search results returned in certain search verticals or categories, and measures of the relevance of the search results to the query.

In an embodiment, the supplement server consults both a query planning component and one or more search components to filter out entities whose search results—or, at least, whose top search result(s)—do not meet the relevancy threshold. Any suitable relevancy ranking algorithm may be used to produce a measure of relevancy. In an embodiment, each search result type may have a different algorithm for determining relevancy and/or a different relevancy threshold. For example, a search for an entity in a news corpus may involve ranking news articles in a search result based on a customized measure of the relevance of each news article to the entity, whereas a search for an entity in a standard web repository may involve ranking web documents in the search result by a more generic measure of relevancy to the entity. In any case, the query planning component and/or the search components pass the measures of relevancy back to the supplement server, which in turn ensures that the measures of relevancy for an entity individually or in aggregate meet a minimum relevance score.

In an embodiment, the supplement server filters out entities so that each selected entity has pre-defined number of search results in certain categories after fetching the search results from various search backend. For example, the supplement server may be configured to ensure that each entity produces at least two quality image results, one quality video result, three quality news article results, and six quality results for related web search queries. The supplement server ignores duplicate search results for an entity.

In an embodiment, the supplement server ensures that the entity's search results produce search results sufficient enough to populate at least one pre-defined federated result template. Each template may call for different numbers of results for different search verticals. For example, the criteria described in the previous paragraph may reflect the demands of a standard news template. But, even though the entity may not produce a quality video search result per the demands of the standard news template, the entity may nonetheless produce a high quality search result in a reference database, as required by a different federated result template.

5.5. Formatting the Supplemental Content

In an embodiment, each supplement includes each entity in the final set of entities, as well as federated search results for each entity in the final set of entities. A separate section may be defined for each entity and its federated search results. All sections may be visible at once, or certain sections may be partially hidden initially, then made visible by clicking on title bars for their respective entities. To this end, supplements may further include instructions and/or markup language instructing the client as to how the supplement should be displayed. In an embodiment, the section corresponding to the highest ranked entity is fully visible at first, while the remaining sections remain partially hidden until selected by a user. In an embodiment, as a result of code included in or referenced by the supplement, the visible section is periodically rotated, without user intervention.

In an embodiment, the search results are organized within a supplement according one or more templates. The template may vary based upon the intended positioning of the supplement relative to the article and/or the intended display device. For example, one template may be defined for a supplement that appears within a sidebar in a standard web page, another template may be defined for a sidebar that appears in a section immediately below the article within a standard web page, another template may be defined for display of the supplement in a mobile web browser, another template may be defined for a pop-up supplement, and so forth.

In an embodiment, depending on the information retrieved, different layouts may be appropriate. For example, if the searches for a particular entity yielded high-quality video, image, and blog results, the server may generate a supplement that includes the highest ranking video on the left of the supplement, the three highest ranked images in the middle of the supplement, and links to the blog articles on the right of the supplement. Meanwhile, if the searches for a particular entity yielded a stock quote, a Wikipedia abstract, and high-quality news results, the supplement may be organized so as to include the Wikipedia abstract on the left of the supplement, the stock quote in the upper right of the supplement, and links to the news articles with accompanying descriptions in the bottom right of the supplement. In an embodiment, query planning and/or federated search components are utilized to determine an appropriate layout for each entity.

5.6. User Personalization

In an embodiment, a supplement server utilizes user-specific data to rank or re-rank primary entities, related entities, and candidate entities. Types of user specific data upon which the rankings may be at least partially based include, without limitation, search query histories, content browsing histories, user-identified preferences, and other user behavioral data. Such data may be collected by monitoring user actions using any suitable means, and then stored within a repository, such as relied upon by user history component 280. In an embodiment, in addition to or instead of user-specific data, the supplement server may base rankings at least partially upon similar data specific to a group of users of which the user is a member.

Thus, an article requested at the same time by different users may produce different supplements tailored to the individual users or to groups to which the individual users belong. For example, different entities may be selected for the supplement as a result of differences in browsing histories for the different users.

In an embodiment, some or all of the search results upon which a supplement is based may be personalized based on location-based data, such as an approximate geographic coordinate or region in which the user appears to be located. For example, a supplement displayed on a cell phone for an article a user is viewing traveling at an airport might differ from the supplement the user would see had the user viewed the article at her home computer. A variety of mechanisms may be utilized to determine such information, including GPS systems, databases mapping network addresses to general coordinates, user preferences, user input, and so on.

In an embodiment, some or all of the search results may be presented with social sharing controls. For example, each item in the supplement may include a "Share with Friends" button that, when clicked, causes the item, or an article from which the item was derived, to be shared with a group of users. In an embodiment, when a user selects the an item in a supplement by, for example, clicking on it, the user is brought a page with greater detail about the item. Meanwhile, the user's selection is logged, and a group of users with which the user is associated may automatically be informed of the user's selection of the item.

5.7. Monetization

In an embodiment, entities and/or search results may be ranked at least partially based on monetization factors. For example, an entity may be selected over another entity because search results for that entity will bring a search provider more revenue. Or, an entity may be selected over another entity because an advertiser has arranged to pay the supplement provider a certain amount of money in exchange for including search results based on the entity in supplements. In an embodiment, various advertisers may have been guaranteed that a certain number of supplements will include certain entities. Ranking processes may therefore attempt to balance entity selection so that the commitment to each advertiser is fulfilled.

In an embodiment, at least one of the repositories searched for information about an entity is a repository of advertisements. Selection of the advertisement may take into account, in addition to an entity from or related to the article, a user's online shopping or browsing history. Furthermore, candidate entities may be filtered based on whether or not they produce a high-quality or high-revenue result from the repository of advertisements.

5.8. Server Optmizations

In an embodiment, a supplement server may be optimized by caching data generated at various stages of the processes described above. For example, the step of generating a supplement for an article—e.g. step 340 of FIG. 3 or step 430 of FIG. 4, is not necessarily performed in response to each and every request for a supplement to the article—rather, step 340 may be performed for an initial request for a supplement for the article, and the results may be cached for responding to subsequent requests. As another example, instead of caching the entire supplement, primary, related, and/or final entities may be cached for an already analyzed article. In an embodiment, data may be cached on a per-user or per-group basis. In an embodiment, cached versions of data expire periodically to allow for updated entity rankings that reflect updated time-sensitive ranking features.

In an embodiment, primary entities and related entities are periodically identified and ranked for each article in a corpus of articles. The entities are stored in a database for later use in generating supplements. The entities and rankings are periodically updated over time—e.g. weekly or monthly—to compensate for changes in the various features relied upon to identify and rank entities. As new articles are added to the corpus, the new articles may automatically be harvested for entities. Or, the supplement server may wait to analyze new articles until a next scheduled periodic refresh time, or until the supplement server is asked to respond to an explicit request for the article.

In an embodiment, the supplement server implements a parallel run-time system to fetch query results from different search back-end systems simultaneously to achieve sub-second response time of to requests for supplements.

5.9. Time Sensitivity

In an embodiment, one or more factors for ranking entities may be time-sensitive. For example, various ranking features may be based on data that is updated over time. Or, entity occurrence frequencies may be weighted so that more recent occurrences of the entity are given greater significance.

Accordingly, in an embodiment, different supplements may be generated for the same article at different times, even though the contents of the article do not change. The supplements generated for an article may differ over time in any number of ways, including not only the search results presented therein, but the primary and/or related entities presented, as well as the overall organization of the information.

5.10. Supplement Server API

In an embodiment, instead of returning entire supplements to requestors, the supplement server returns entities and federated search results to certain requestors, so that the requestors can organize and format supplemental content according to their own preferences. For such requestors, the supplement server provides two main APIs: an "entity result set" API and an "entity search result" API. The first API takes an article as input and returns a result set comprising a final set of entities for a supplement, per the description above. The first API may optionally return a single federated search result for the first entity in the final set of entities. The second API takes an entity as input and returns federated search results for the entity. The requestor may, for example, display the federated search results for the first entity along with a menu that allows a user to select other entities that were identified for the article. In response to the selecting another entity, the requestor may request additional federated search results for the selected entity.

5.11. Miscellaneous

According to an embodiment, primary entities may be extracted from input other than an article of content requested by a user. For example, primary entities may be selected from an arbitrary text file, a set of user preferences, a user's search history, a user's browsing history, and so on. The supplement may then be displayed to the user with any content, or even in isolation.

6.0. Implementation Mechanism—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
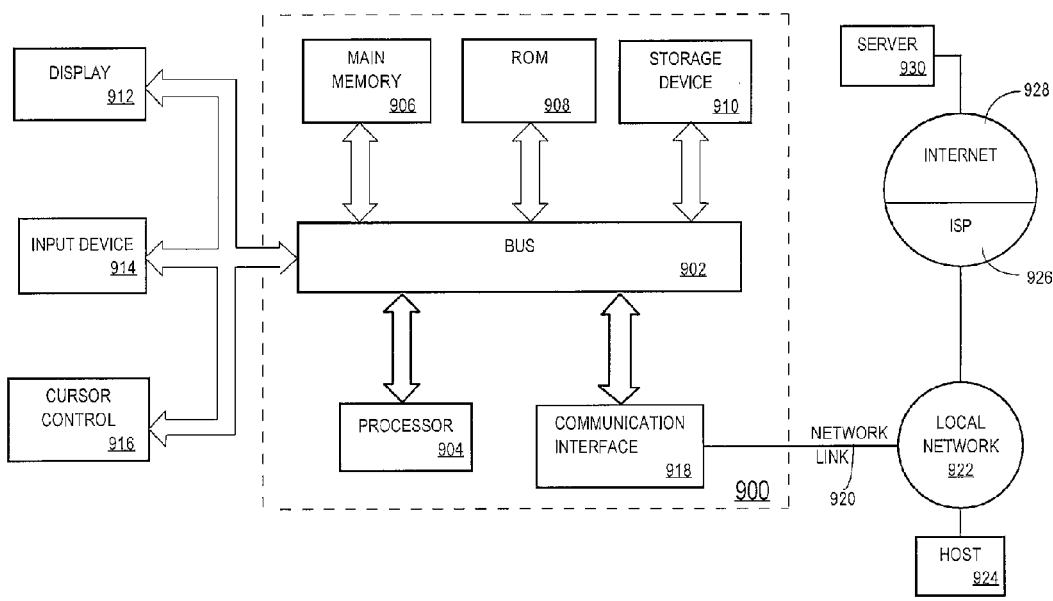
FIG. 9 is block diagram of a computer system upon which embodiments of the invention may be implemented.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

7.0. Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   extracting a set of constituent entities from an article;
   selecting a set of primary entities, each primary entity in the set of primary entities originating from the set of constituent entities;
   based on the set of primary entities, selecting a set of related entities;
   wherein selecting the set of related entities comprises: for each primary entity in the set of primary entities, searching for co-occurring related entities that co-occur with the primary entity in entries within: a repository of one or more search query logs;
   wherein selecting the set of related entities further comprises: for each primary entity in the set of primary entities, selecting one or more related entities based at least on said searching and a ranking process based on co-occurrence frequencies;
   forming a set of candidate entities that includes both primary entities from the set of primary entities and related entities from the set of related entities;
   ranking the set of candidate entities, wherein the ranking includes determining a rank of each primary entity in the set of candidate entities relative to both the primary entities and the related entities in the set of candidate entities, and determining a rank of each related entity in the set of candidate entities relative to both the primary entities and the related entities in the set of candidate entities;

selecting a final set of entities from the set of candidate entities based on the ranking of the set of candidate entities, wherein the final set of entities is smaller than the candidate set of entities;

generating a supplement, to the article, comprising search results for each entity in the final set of entities;

wherein the method is performed by one or more computing devices.

2. The method of claim 1, wherein the supplement further comprises each entity in the final set of entities.

3. The method of claim 1,
wherein the supplement is a first supplement generated at a first time;
wherein one or more of the steps of ranking the set of candidate entities, selecting the set of related entities, or selecting the set of primary entities are based at least partially upon a set of features;
wherein the method further comprises performing the steps of claim 1 at a second time to generate a second supplement; and
wherein the second supplement differs from the first supplement as a result of a time-sensitive change to at least one feature in the set of features.

4. The method of claim 1, wherein one or more of the steps of ranking the set of candidate entities, selecting the set of related entities, or selecting the set of primary entities are based at least partially upon user-specific data, wherein the user-specific data includes at least one of a search history for the user or a browsing history for the user.

5. The method of claim 1, further comprising causing a client to display the supplement to a user in association with a display of the article.

6. The method of claim 1, further comprising causing a client to display the supplement to a user inline within a structured document comprising the article and the supplement, in response to a request from the client for the article.

7. The method of claim 1, wherein the supplement comprises, for each entity in the final set of entities, a set of federated search results, wherein each federated search result in the set of federated search results includes at least two sets of search results, the at least two sets pertaining to at least two different search repositories.

8. The method of claim 1, wherein at least the step of generating a supplement to the article is performed dynamically, in response to a request for the supplement, wherein the request indicates the article.

9. The method of claim 1, further comprising identifying one or more entities of the primary entities or the related entities based on a user associated with the request.

10. The method of claim 1, wherein generating the supplement comprises generating a different section for each particular entity in the final set of entities, each different section displaying federated search results obtained for the corresponding particular entity, wherein the federated search results displayed in a particular section comprises at least a first subsection comprising one or more document summaries of one or more documents returned by searching a repository of documents for the corresponding particular entity and a second subsection comprising one or more media items returned by searching a repository of media items for the same corresponding particular entity.

11. The method of claim 1, wherein generating the supplement comprises identifying which of a plurality of different federated search templates to use for each particular entity in the final set of entities, and generating a federated search result within the supplement for each particular entity in the final set of entities, based on which of the plurality of different federated search templates was identified for the particular entity.

12. The method of claim 1,
wherein selecting the final set of entities further comprises determining whether search results for each candidate entities meets constraints associated with one or more search results templates;
wherein the constraints for each particular template of the one or more search results templates at least indicate minimum numbers of high-quality search results, from each of a plurality of different search verticals, that must be returned for an entity in order for search results for that entity to be formatted according to the particular template;
wherein the search results in the supplement are formatted according to at least one matching template from the one or more search results templates.

13. The method of claim 1, wherein the supplement comprises a plurality of tabs, each of the tabs configured to swap into view a different section, of a plurality of sections, that corresponds to the tab, each of the plurality of sections corresponding to a different entity in the final set of entities, each of the tabs comprising a label identifying the different entity that corresponds to the different section, each of the plurality of sections comprising search results for the corresponding different entity.

14. The method of claim 1, wherein selecting the set of related entities further comprises, for each primary entity in the set of primary entities, searching for co-occurring related entities that co-occur with the primary entity in entries within: a corpus of articles and a repository of human-entered relationship data.

15. One or more non-transitory computer-readable media storing instructions that, when executed by one or more computing devices, cause performance of steps of:

extracting a set of constituent entities from an article;

selecting a set of primary entities, each primary entity in the set of primary entities originating from the set of constituent entities;

based on the set of primary entities, selecting a set of related entities;

wherein selecting the set of related entities comprises: for each primary entity in the set of primary entities, searching for co-occurring related entities that co-occur with the primary entity in entries within: a repository of one or more search query logs;

wherein selecting the set of related entities further comprises: for each primary entity in the set of primary entities, selecting one or more related entities based at least on said searching and a ranking process based on co-occurrence frequencies;

forming a set of candidate entities that includes both primary entities from the set of primary entities and related entities from the set of related entities;

ranking the set of candidate entities, wherein the ranking includes determining a rank of each primary entity in the set of candidate entities relative to both the primary entities and the related entities in the set of candidate entities, and determining a rank of each related entity in the set of candidate entities relative to both the primary entities and the related entities in the set of candidate entities;

selecting a final set of entities from the set of candidate entities based on the ranking of the set of candidate entities, wherein the final set of entities is smaller than the candidate set of entities;

generating a supplement, to the article, comprising search results for each entity in the final set of entities.

16. The one or more non-transitory computer-readable media of claim 15, wherein the supplement further comprises each entity in the final set of entities.

17. The one or more non-transitory computer-readable media of claim 15,
    wherein the supplement is a first supplement generated at a first time;
    wherein one or more of the steps of ranking the set of candidate entities, selecting the set of related entities, or selecting the set of primary entities are based at least partially upon a set of features;
    wherein the steps further comprise performing the steps of claim 15 at a second time to generate a second supplement; and
    wherein the second supplement differs from the first supplement as a result of a time-sensitive change to at least one feature in the set of features.

18. The one or more non-transitory computer-readable media of claim 15, wherein one or more of the steps of ranking the set of candidate entities, selecting the set of related entities, or selecting the set of primary entities are based at least partially upon user-specific data, wherein the user-specific data includes at least one of a search history for the user or a browsing history for the user.

19. The one or more non-transitory computer-readable media of claim 15, wherein the steps further comprise causing a client to display the supplement to a user in association with a display of the article.

20. The one or more non-transitory computer-readable media of claim 15, wherein the steps further comprise causing a client to display the supplement to a user inline within a structured document comprising the article and the supplement, in response to a request from the client for the article.

21. The one or more non-transitory computer-readable media of claim 15, wherein the supplement comprises, for each entity in the final set of entities, a set of federated search results, wherein each federated search result in the set of federated search results includes at least two sets of search results, the at least two sets pertaining to at least two different search repositories.

22. The one or more non-transitory computer-readable media of claim 15, wherein at least the step of generating a supplement to the article is performed dynamically, in response to a request for the supplement, wherein the request indicates the article.

23. The one or more non-transitory computer-readable media of claim 15, wherein the steps further comprise identifying one or more entities of the primary entities or the related entities based on a user associated with the request.

24. The one or more non-transitory computer-readable media of claim 15, wherein generating the supplement comprises generating a different section for each particular entity in the final set of entities, each different section displaying federated search results obtained for the corresponding particular entity, wherein the federated search results displayed in a particular section comprises at least a first subsection comprising one or more document summaries of one or more documents returned by searching a repository of documents for the corresponding particular entity and a second subsection comprising one or more media items returned by searching a repository of media items for the same corresponding particular entity.

25. The one or more non-transitory computer-readable media of claim 15, wherein generating the supplement comprises identifying which of a plurality of different federated search templates to use for each particular entity in the final set of entities, and generating a federated search result within the supplement for each particular entity in the final set of entities, based on which of the plurality of different federated search templates was identified for the particular entity.

26. The one or more non-transitory computer-readable media of claim 15,
    wherein selecting the final set of entities further comprises determining whether search results for each candidate entities meets constraints associated with one or more search results templates;
    wherein the constraints for each particular template of the one or more search results templates at least indicate minimum numbers of high-quality search results that must be returned for an entity, from each of a plurality of different search verticals, in order for search results for that entity to be formatted according to the particular template;
    wherein the search results in the supplement are formatted according to at least one matching template from the one or more search results templates.

27. The one or more non-transitory computer-readable media of claim 15, wherein the supplement comprises a plurality of tabs, each of the tabs configured to swap into view a different section, of a plurality of sections, that corresponds to the tab, each of the plurality of sections corresponding to a different entity in the final set of entities, each of the tabs comprising a label identifying the different entity that corresponds to the different section, each of the plurality of sections comprising search results for the corresponding different entity.

28. The one or more non-transitory computer-readable media of claim 15, wherein selecting the set of related entities further comprises, for each primary entity in the set of primary entities, searching for co-occurring related entities that co-occur with the primary entity in entries within: a corpus of articles and a repository of human-entered relationship data.

29. A method comprising:
    extracting a set of constituent entities from an article;
    wherein extracting the set of constituent entities comprises extracting entities using both a dictionary-based lookup and a grammar-based recognition algorithm;
    selecting a set of primary entities, each primary entity in the set of primary entities originating from the set of constituent entities;
    wherein selecting the set of primary entities comprises ranking the set of constituent entities based at least on the frequency with which they occur within the article;
    based on the set of primary entities, selecting a set of related entities;
    wherein selecting the set of related entities comprises: for each entity in the set of primary entities, searching for co-occurring related entities in entries within one or more of: a repository of search query logs or a corpus of articles;
    wherein selecting the set of related entities further comprises: for each entity in the set of primary entities, selecting one or more related entities based at least on said searching and a ranking process based on co-occurrence frequencies;

forming a set of candidate entities that includes both primary entities from the set of primary entities and related entities from the set of related entities;

ranking the set of candidate entities, wherein the ranking includes determining a rank of each primary entity in the set of candidate entities relative to both the primary entities and the related entities in the set of candidate entities, and determining a rank of each related entity in the set of candidate entities relative to both the primary entities and the related entities in the set of candidate entities;

selecting a final set of entities from the set of candidate entities based on the ranking of the set of candidate entities, wherein the final set of entities is smaller than the candidate set of entities;

wherein selecting the final set of entities is based on at least: a ranking function applied to each entity in the set of candidate entities and determining that search results for each entity in the final set of entities meet predefined criteria, wherein the predefined criteria include at least one of: a measure of the quality of the search results, and a count of hits in a subset of the search results, the subset pertaining to a specific search vertical;

generating a supplement, to the article, comprising search results for each entity in the final set of entities;

wherein the method is performed by one or more computing devices.

30. One or more non-transitory computer-readable media storing instructions that, when executed by one or more computing devices, cause performance of steps of:

extracting a set of constituent entities from an article;

wherein extracting the set of constituent entities comprises extracting entities using both a dictionary-based lookup and a grammar-based recognition algorithm;

selecting a set of primary entities, each primary entity in the set of primary entities originating from the set of constituent entities; wherein selecting the set of primary entities comprises ranking the set of constituent entities based at least on the frequency with which they occur within the article;

based on the set of primary entities, selecting a set of related entities;

wherein selecting the set of related entities comprises: for each entity in the set of primary entities, searching for co-occurring related entities in entries within one or more of: a repository of search query logs or a corpus of articles;

wherein selecting the set of related entities further comprises: for each entity in the set of primary entities, selecting one or more related entities based at least on said searching and a ranking process based on co-occurrence frequencies;

forming a set of candidate entities that includes both primary entities from the set of primary entities and related entities from the set of related entities;

ranking the set of candidate entities, wherein the ranking includes determining a rank of each primary entity in the set of candidate entities relative to both the primary entities and the related entities in the set of candidate entities, and determining a rank of each related entity in the set of candidate entities relative to both the primary entities and the related entities in the set of candidate entities;

selecting a final set of entities from the set of candidate entities based on the ranking of the set of candidate entities, wherein the final set of entities is smaller than the candidate set of entities;

wherein selecting the final set of entities is based on at least: a ranking function applied to each entity in the set of candidate entities and determining that search results for each entity in the final set of entities meet predefined criteria, wherein the predefined criteria include at least one of: a measure of the quality of the search results, and a count of hits in a subset of the search results, the subset pertaining to a specific search vertical;

generating a supplement, to the article, comprising search results for each entity in the final set of entities.

31. A method comprising:

receiving a request for an article of content;

providing a supplemented article in response to the request;

wherein the provided supplemented article comprises:
the content of the requested article;
a supplement that includes two or more sections, each of the two or more sections corresponding to a different entity of a plurality of entities, wherein each of the plurality of entities is selected based at least in part upon the content;
wherein the plurality of entities includes at least a first entity that was extracted from the content of the article;
wherein the plurality of entities further includes at least a second entity selected from a set of related entities, not found in the content of the article, that are related to constituent entities extracted from the content of the article;
wherein the supplement comprises a plurality of tabs, each of the tabs configured to swap into view a different section, of the two or more sections, that corresponds to the tab, each of the tabs comprising a label identifying the different entity that corresponds to the different section;
wherein each particular section of the two or more sections displays multiple search results obtained from one or more searches for the entity, of the plurality of entities, that corresponds to the particular section;
wherein the multiple search results for at least two of the two or more sections are arranged according to different search results templates, the different search results template used for a given section reflecting which types of search results are displayed in the given section;

wherein the method is performed by one or more computing devices.

32. The method of claim 31, wherein the different search results templates are associated with constraints that indicate which entities are shown with which search results;

wherein the constraints for each of the different search results templates at least indicate minimum numbers of high-quality search results must be returned from each of a plurality of different search verticals;

wherein the plurality of entities are selected, in part, based upon search results for each particular entity of the plurality of entities meeting the constraints for at least one of the different search results templates.

* * * * *